US008687259B2

(12) United States Patent
Adlem et al.

(10) Patent No.: US 8,687,259 B2
(45) Date of Patent: Apr. 1, 2014

(54) POLYMERISABLE LC MATERIAL AND POLYMER FILM WITH NEGATIVE OPTICAL DISPERSION

(75) Inventors: Kevin Adlem, Dorset (GB); Owain Llyr Parri, Ringwood (GB); David Wilkes, Darmstadt (DE); Patricia Eileen Saxton, Romsey (GB)

(73) Assignee: Merck Patent GmbH, Darmstadt (DE)

( * ) Notice: Subject to any disclaimer, the term of this patent is extended or adjusted under 35 U.S.C. 154(b) by 95 days.

(21) Appl. No.: 13/504,219

(22) PCT Filed: Oct. 6, 2010

(86) PCT No.: PCT/EP2010/006092
§ 371 (c)(1),
(2), (4) Date: Apr. 26, 2012

(87) PCT Pub. No.: WO2011/050896
PCT Pub. Date: May 5, 2011

(65) Prior Publication Data
US 2012/0224245 A1    Sep. 6, 2012

(30) Foreign Application Priority Data
Oct. 30, 2009 (EP) .................................. 09013657

(51) Int. Cl.
*G02F 1/03* (2006.01)
*C09K 19/30* (2006.01)
*B82Y 20/00* (2011.01)

(52) U.S. Cl.
CPC ...................................... *B82Y 20/00* (2013.01)
USPC ...................................... 359/245; 252/299.63

(58) Field of Classification Search
USPC ............. 359/245; 252/299.01, 299.6, 299.61, 252/299.62, 299.63
See application file for complete search history.

(56) References Cited

U.S. PATENT DOCUMENTS

| 8,119,026 B2 | 2/2012 | Parri et al. |
| 2010/0072422 A1 | 3/2010 | Parri et al. |
| 2010/0110362 A1 | 5/2010 | Parri et al. |

FOREIGN PATENT DOCUMENTS

| WO | WO-2008 119426 | 10/2008 |
| WO | WO-2008 119427 | 10/2008 |

OTHER PUBLICATIONS

Parri, O. et al., "Negative dispersion reactive mesogen materials for optical films," Proceedings of the IDW '09 (Dec. 9-11, 2009), vol. 16, pp. 639-642, ISSN: 1883-2490.
International Search Report for PCT/EP2010/006092 dated Jan. 12, 2011.

*Primary Examiner* — Jack Dinh
(74) *Attorney, Agent, or Firm* — Millen, White, Zelano & Branigan, P.C.

(57) ABSTRACT

The invention relates to a polymerizable LC material with negative optical dispersion, a polymer film with negative optical dispersion obtainable from such a material, and the use of the polymerizable LC material and polymer film in optical, electrooptical, electronic, semiconducting or luminescent components or devices.

21 Claims, 5 Drawing Sheets

POLYMERISABLE LC MATERIAL AND POLYMER FILM WITH NEGATIVE OPTICAL DISPERSION

FIELD OF THE INVENTION

The invention relates to a polymerisable LC material with negative optical dispersion, a polymer film with negative optical dispersion obtainable from such a material, and the use of the polymerisable LC material and polymer film in optical, electrooptical, electronic, semiconducting or luminescent components or devices.

BACKGROUND AND PRIOR ART

Prior art describes improved birefringent optical films with negative optical retardation dispersion which are suitable for use as achromatic optical retarders or compensators in liquid crystal (LC) displays. For example, WO 2008/119427 A1 describes a birefringent polymer film with negative optical dispersion, which is obtainable from a polymerisable LC material comprising as negative dispersion component compounds having the structure shown below or derivatives thereof:

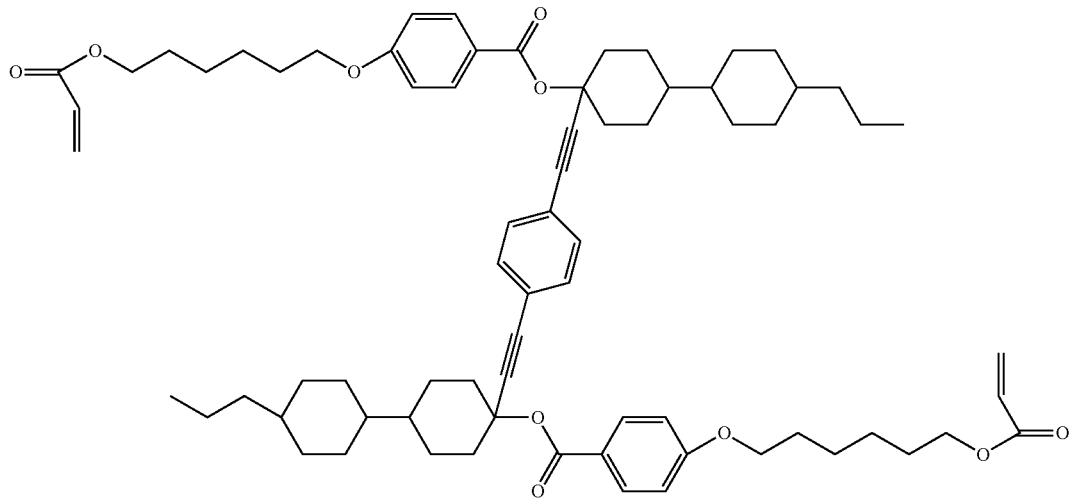 [SMILES: C=CC(=O)OCCCCCCOc1ccc(C(=O)OC2(C#Cc3ccc(C#CC4(OC(=O)c5ccc(OCCCCCCOC(=O)C=C)cc5)CCC(C5CCC(CCC)CC5)CC4)cc3)CCC(C3CCC(CCC)CC3)CC2)cc1]

The ratio of the negative dispersion component in the polymerisable LC material disclosed in WO 2008/119427 A1 is for example 50-60% of the total amount of solids (i.e. without solvents).

However, the negative dispersion materials disclosed in prior art still leave room for further improvements. For example, it is desired to reduce the amount of the usually costly negative dispersion compounds in the polymerisable mixture. Also, since the retardation of an optical retardation film is given by the product of its birefringence and film thickness, and thinner films are generally preferred in flat panel display applications, it is desired to increase the birefringence of the film so that the film thickness can be reduced while achieving the same retardation.

The films with negative dispersion can be used for example as A plate or C plate retarders. A positive A plate retarder is suitable for example for use in a circular polariser in for example an OLED panel to reduce reflections and therefore increase the contrast ratio. A positive C plate retarder is suitable for example for use as a component in an IPS mode LCD compensator film.

Also, the negative dispersion compounds and the polymerisable LC mixtures comprising them, which are used for film preparation, should exhibit good thermal properties, in particular a modest melting point, a good solubility in the LC host and in organic solvents, and reasonable extrapolated clearing point, and should further exhibit excellent optical properties. Also, they should be suitable for making commercially viable quarter wave films in a large scale manufacturing process.

This invention has the aim of providing improved polymer films and polymerisable materials for their preparation, which do not have the drawbacks of the prior art materials and have the advantages mentioned above and below.

Another aim of the invention is to extend the pool of polymer films and materials having negative dispersion that are available to the expert. Other aims are immediately evident to the expert from the following description.

It has been found that these aims can be achieved by providing polymerisable LC materials and polymer films as claimed in the present invention.

SUMMARY OF THE INVENTION

The invention relates to a polymerisable LC material comprising from 1 to 45% of one or more compounds of formula I

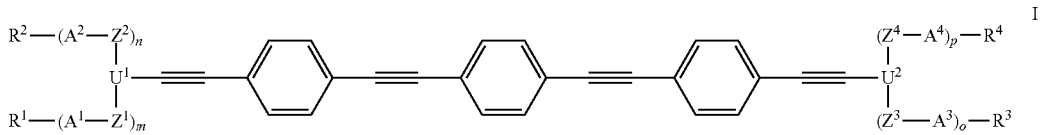

wherein
U$^{1,2}$ are independently of each other selected from

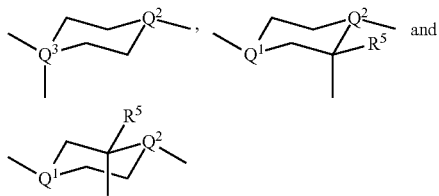

including their mirror images, wherein the rings U$^1$ and U$^2$ are each bonded to the central bitolane group via the axial bond, and one or two non-adjacent CH$_2$ groups in these rings are optionally replaced by O and/or S, and the rings U$^1$ and U$^2$ are optionally substituted by one or more groups L, Q$^{1,2}$ are independently of each other CH or SiH, Q$^3$ is C or Si, A$^{1-4}$ are independently of each other selected from non-aromatic, aromatic or heteroaromatic carbocyclic or heterocyclic groups, which are optionally substituted by one or more groups R$^5$, and wherein each of -(A$^1$-Z$^1$)$_m$—U$^1$—(Z$^2$-A$^2$)$_n$- and -(A$^3$-Z$^3$)$_o$—U$^2$—(Z$^4$-A$^4$)$_p$- does not contain more aromatic groups than non-aromatic groups and preferably does not contain more than one aromatic group, Z$^{1-4}$ are independently of each other —O—, —S—, —CO—, —COO—, —OCO—, —O—COO—, —CO—NR$^0$—, —NR$^0$—CO—, —NR$^0$—CO—NR$^0$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_3$—, —(CH$_2$)$_4$—, —CF$_2$CH$_2$—, —CH$_2$CF$_2$—, —CF$_2$CF$_2$—, —CH=CH—, —CY$^1$=CY$^2$—, —CH=N—, —N=CH—, —N=N—, —CH=CR$^0$—, —C≡C—, —CH=CH—COO—, —OCO—CH=CH—, CR$^0$R$^{00}$ or a single bond, Y$^{1,2}$ are independently of each other H, F, Cl, CN or R$^0$, R$^0$ and R$^{00}$ are independently of each other H or alkyl with 1 to 12 C-atoms, m and n are independently of each other 0, 1, 2, 3 or 4, o and p are independently of each other 0, 1, 2, 3 or 4, R$^{1-5}$ are independently of each other identical or different groups selected from H, halogen, —CN, —NC, —NCO, —NCS, —OCN, —SCN, —C(=O)NR$^0$R$^{00}$, —C(=O)X$^0$, —C(=O)R$^0$, —NH$_2$, —NR$^0$R$^{00}$, —SH, —SR$^0$, —SO$_3$H, —SO$_2$R$^0$, —OH, —NO$_2$, —CF$_3$, —SF$_5$, P-Sp-, optionally substituted silyl, or carbyl or hydrocarbyl with 1 to 40 C atoms that is optionally substituted and optionally comprises one or more hetero atoms, or denote P or P-Sp-, or are substituted by P or P-Sp-, wherein the compounds comprise at least one group R$^{1-4}$ that denotes P or P-Sp- or is substituted by P or P-Sp-, P is a polymerisable group, Sp is a spacer group or a single bond, and further comprising from 50% to 99% of polymerisable mesogenic or liquid crystalline compounds different from formula I.

The invention further relates to a birefringent polymer film being obtainable or obtained by polymerising a polymerisable LC material as described above and below, preferably in its LC phase in an oriented state in form of a thin film.

The invention in particular relates to a polymerisable LC material or polymer film as described above and below, having negative retardation dispersion, i.e. with R$_{450}$/R$_{550}$<1, wherein R$_{450}$ is the optical on-axis retardation at a wavelength of 450 nm and R$_{550}$ is the optical on-axis retardation at a wavelength of 550 nm.

The invention further relates to the use of a polymerisable LC material or polymer film as described above and below in optical, electronic and electrooptical components and devices, preferably in optical films, retarders or compensators having negative optical dispersion.

The invention especially relates to a polymer film as described above and below, which is an A plate or a C plate, preferably a positive A plate (+A plate) or positive C plate (+C plate).

The invention further relates to an optical, electronic or electrooptical component or device, comprising a compound, polymerisable LC material or polymer film as described above and below.

Said devices and components include, without limitation, electrooptical displays, LCDs, optical films, retarders, compensators, polarisers, beam splitters, reflective films, alignment layers, colour filters, holographic elements, hot stamping foils, coloured images, decorative or security markings, LC pigments, adhesives, non-linear optic (NLO) devices, optical information storage devices, electronic devices, organic semiconductors, organic field effect transistors (OFET), integrated circuits (IC), thin film transistors (TFT), Radio Frequency Identification (RFID) tags, organic light emitting diodes (OLED), organic light emitting transistors (OLET), electroluminescent displays, organic photovoltaic (OPV) devices, organic solar cells (O-SC), organic laser diodes (O-laser), organic integrated circuits (O-IC), lighting devices, sensor devices, electrode materials, photoconductors, photodetectors, electrophotographic recording devices, capacitors, charge injection layers, Schottky diodes, planarising layers, antistatic films, conducting substrates, conducting patterns, photoconductors, electrophotographic applications, electrophotographic recording, organic memory devices, biosensors, biochips.

TERMS AND DEFINITIONS

Figure 1A:
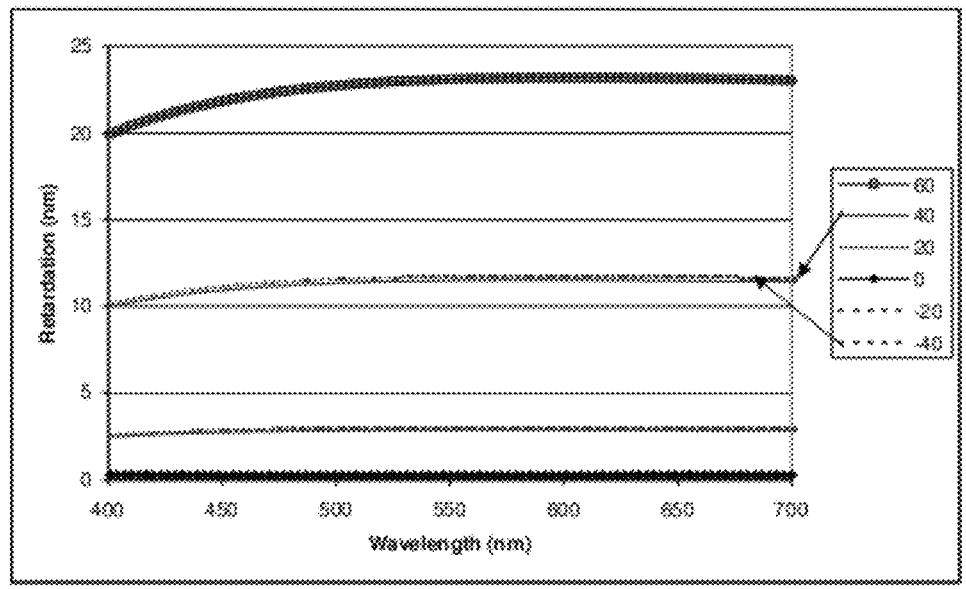
FIG. 1a shows the retardation dispersion.

The term "liquid crystal or mesogenic compound" means a compound comprising one or more calamitic (rod- or board/lath-shaped) or discotic (disk-shaped) mesogenic groups. The term "mesogenic group" means a group with the ability to induce liquid crystal (LC) phase behaviour. The compounds comprising mesogenic groups do not necessarily have to exhibit an LC phase themselves. It is also possible that they show LC phase behaviour only in mixtures with other compounds, or when the mesogenic compounds or materials, or the mixtures thereof, are polymerised. For the sake of simplicity, the term "liquid crystal" is used hereinafter for both mesogenic and LC materials. For an overview of definitions see C. Tschierske, G. Pelzl and S. Diele, Angew. Chem. 2004, 116, 6340-6368.

A calamitic mesogenic group is usually comprising a mesogenic core consisting of one or more aromatic or non-aromatic cyclic groups connected to each other directly or via linkage groups, optionally comprising terminal groups attached to the ends of the mesogenic core, and optionally comprising one or more lateral groups attached to the long side of the mesogenic core, wherein these terminal and lateral groups are usually selected e.g. from carbyl or hydrocarbyl groups, polar groups like halogen, nitro, hydroxy, etc., or polymerisable groups.

The term "reactive mesogen" (RM) means a polymerisable mesogenic or liquid crystal compound.

Polymerisable compounds with one polymerisable group are also referred to as "monoreactive" compounds, compounds with two polymerisable groups as "direactive" compounds, and compounds with more than two polymerisable groups as "multireactive" compounds. Compounds without a polymerisable group are also referred to as "non-reactive" compounds.

The term "film" includes rigid or flexible, self-supporting or free-standing films with mechanical stability, as well as coatings or layers on a supporting substrate or between two substrates.

The term "carbyl group" means any monovalent or multivalent organic radical moiety which comprises at least one carbon atom either without any non-carbon atoms (like for example —C≡C—), or optionally combined with at least one non-carbon atom such as N, O, S, P, Si, Se, As, Te or Ge (for example carbonyl etc.). The term "hydrocarbyl group" denotes a carbyl group that does additionally contain one or more H atoms and optionally contains one or more hetero atoms like for example N, O, S, P, Si, Se, As, Te or Ge. A carbyl or hydrocarbyl group comprising a chain of 3 or more C atoms may also be linear, branched and/or cyclic, including spiro and/or fused rings.

On the molecular level, the birefringence of a liquid crystal depends on the anisotropy of the polarizability ($\Delta\alpha = \alpha_{81} - \alpha\bot$). "Polarizability" means the ease with which the electron distribution in the atom or molecule can be distorted. The polarizability increases with greater number of electrons and a more diffuse electron cloud. The polarizability can be calculated using a method described in eg Jap. J. Appl. Phys. 42, (2003) p 3463.

The "optical retardation" at a given wavelength $R(\lambda)$ (in nm) of a layer of liquid crystalline or birefringent material is defined as the product of birefringence at that wavelength $\Delta n(\lambda)$ and layer thickness d (in nm) according to the equation $$R(\lambda) = \Delta n(\lambda) \cdot d$$

The optical retardation R represents the difference in the optical path lengths in nanometers travelled by S-polarised and P-polarised light whilst passing through the birefringent material. "On-axis" retardation means the retardation at normal incidence to the sample surface.

The term "negative (optical) dispersion" refers to a birefringent or liquid crystalline material or layer that displays reverse birefringence dispersion where the magnitude of the birefringence ($\Delta n$) increases with increasing wavelength ($\lambda$). i.e $|\Delta n(450)| < |\Delta n(550)|$, or $\Delta n(450)/\Delta n(550) < 1$, where $\Delta n(450)$ and $\Delta n(550)$ are the birefringence of the material measured at wavelengths of 450 nm and 550 nm respectively. In contrast, positive (optical) dispersion" means a material or layer having $|\Delta n(450)| > |\Delta n(550)|$ or $\Delta n(450)/\Delta n(550) > 1$. See also for example A. Uchiyama, T. Yatabe "Control of Wavelength Dispersion of Birefringence for Oriented Copolycarbonate Films Containing Positive and Negative Birefringent Units". J. Appl. Phys. Vol. 42 pp 6941-6945 (2003).

Since the optical retardation at a given wavelength is defined as the product of birefringence and layer thickness as described above $[R(\lambda) = \Delta n(\lambda) \cdot d]$, the optical dispersion can be expressed either as the "birefringence dispersion" by the ratio $\Delta n(450)/\Delta n(550)$, or as "retardation dispersion" by the ratio $R(450)/R(550)$, wherein $R(450)$ and $R(550)$ are the retardation of the material measured at wavelengths of 450 nm and 550 nm respectively. Since the layer thickness d does not change with the wavelength, $R(450)/R(550)$ is equal to $\Delta n(450)/\Delta n(550)$. Thus, a material or layer with negative or reverse dispersion has $R(450)/R(550) < 1$ or $|R(450)| < |R(550)|$, and a material or layer with positive or normal dispersion has $R(450)/R(550) > 1$ or $|R(450)| > |R(550)|$.

In the present invention, unless stated otherwise "optical dispersion" means the retardation dispersion i.e. the ratio $R(450)/R(550)$.

The term "high dispersion" means that the absolute value of the dispersion shows a large deviation from 1, whereas the term "low dispersion" means that the absolute value of the dispersion shows a small deviation from 1. Thus "high negative dispersion" means that the dispersion value is significantly smaller than 1, and "low negative dispersion" means that the dispersion value is only slightly smaller than 1.

The retardation ($R(\lambda)$) of a material can be measured using a spectroscopic ellipsometer, for example the M2000 spectroscopic ellipsometer manufactured by J. A. Woollam Co., This instrument is capable of measuring the optical retardance in nanometers of a birefringent sample e.g. Quartz over a range of wavelengths typically, 370 nm to 2000 nm. From this data it is possible to calculate the dispersion ($R(450)/R(550)$ or $\Delta n(450)/\Delta n(550)$) of a material.

A method for carrying out these measurements was presented at the National Physics Laboratory (London, UK) by N. Singh in October 2006 and entitled "Spectroscopic Ellipsometry, Part 1—Theory and Fundamentals, Part 2—Practical Examples and Part 3—measurements". In accordance with the measurement procedures described Retardation Measurement (RetMeas) Manual (2002) and Guide to WVASE (2002) (Woollam Variable Angle Spectroscopic Ellipsometer) published by J. A. Woollam Co. Inc (Lincoln, Nebr., USA). Unless stated otherwise, this method is used to determine the retardation of the materials, films and devices described in this invention.

The term "A plate" refers to an optical retarder utilizing a layer of uniaxially birefringent material with its extraordinary axis oriented parallel to the plane of the layer. The term "C plate" refers to an optical retarder utilizing a layer of uniaxially birefringent material with its extraordinary axis oriented perpendicular to the plane of the layer. In A/C-plates comprising optically uniaxial birefringent liquid crystal material with uniform orientation, the optical axis of the film is given by the direction of the extraordinary axis. An A (or C) plate comprising optically uniaxial birefringent material with positive birefringence is also referred to as "positive A (or C) plate" or "+A (or +C) plate". An A (or C) plate comprising a film of optically uniaxial birefringent material with negative birefringence, such as discotic anisotropic materials is also referred to as "negative A (or C) plate" or "−A (or C) plate" depending on the orientation of the discotic materials. A film made from a chiolesteric calamitic material with a relection band in the UV part of the spectrum also has the optics of a negative C plate.

DETAILED DESCRIPTION OF THE INVENTION

Preferably the polymer film according to the present invention is prepared by polymerising an LC material comprising one or more compounds of formula I, and one or more polymerisable mesogenic or liquid crystalline compounds. Preferably the polymerisable LC material has an achiral nematic phase and does not contain chiral or optically active components.

The polymer film according to the present invention preferably has positive birefringence and negative (or "reverse") dispersion.

The compounds of formula I preferably have a positive birefringence at 550 nm and a negative (reverse) birefringence dispersion. In this case $\Delta n(450)/\Delta n(550)$ can be negative if the compound has a negative birefringence at 450 nm.

The other mesogenic or liquid crystalline compounds comprised in the LC material preferably have a positive birefringence at 550 nm and a positive (or "normal") birefringence dispersion.

Prior art has disclosed the use of compounds that can be added to polymerisable reactive mesogens to create films with reverse birefringence dispersion. However, the films disclosed in prior art have low birefringence, and the amount of additive is greater than 50% for example in case of an A plate, and therefore requires a thick coating with a thickness of at least 3 microns or even more, in order to produce for example an A plate with a retardation of 137.5 nm at normal incidence that could be used as a quarter wave film.

In contrast thereto, the compounds and polymerisable LC materials disclosed in this invention have a higher birefringence compared to compounds and LC materials with negative dispersion as known from prior art. This enables the preparation of A plate and C plate retarders that have a lower thickness, which makes them especially suitable for flat panel applications, while still achieving the desired retardation values that make them suitable for use as optical retarder, for example as quarter wave retarder (in case of an A plate) or homeotropic compensator (in case of a C plate).

At the same time, the compounds of formula I show a high negative optical dispersion, so that they can achieve negative dispersion in the final LC mixture of polymer film even when used at lower concentrations compared to the compounds and materials of prior art. This allows to reduce the amount of the costly negative dispersion component in the polymer film and thus to lower the manufacturing costs.

However, it should be noted that it is not always possible to fulfil at the same time the requirements of a high positive birefringence and a high negative dispersion, since a compound with negative dispersion usually has a lower birefringence than the other reactive mesogens present in the polymerisable LC material, whereas the latter on the other hand usually show positive dispersion. Thus, there is a possible trade-off between high birefringence and high negative dispersion. For example, when increasing the amount of compounds of formula I in the poymerisable LC material the negative dispersion of the material will typically increase (i.e. the dispersion value decreases), but at the same time the birefringence will usually decrease. The concentration of the compounds of formula I therefore has to be carefully selected to find the correct balance between desired dispersion and desired birefringence, according to the desired use of the final polymer film.

The concentration of the compounds of formula I in the polymerisable LC material according to the present invention is from 1 to 45%.

In a polymerisable LC material used for the preparation of an +A plate (hereinafter also referred to as "A plate formulation"), the concentration of the compounds of formula I is preferably from 20% to 45%, very preferably from 30 to 45%.

In a polymerisable LC material used for the preparation of a +C plate (hereinafter also referred to as "C plate formulation"), the concentration of the compounds of formula I is preferably from 5 to 35%, very preferably from 10 to 30%.

Especially preferred concentrations of the compounds of formula I in the polymerisable LC material are as follows:
  in formulations for an +A Plate with a dispersion <1.0, from 1 to 35%, preferably from 20 to 35%,
  in formulations for an +A Plate with a dispersion <0.9, from 1 to 45%, preferably from 35 to 45%,
  in formulations for a +C Plate with a dispersion <1.0, from 1 to 20%, preferably from 10 to 20%,
  in formulations for a +C Plate with a dispersion <0.9, from 1 to 25%, preferably from 15 to 25%,
  in formulations for a +C Plate with a dispersion <0.85, from 1 to 35%, preferably from 20 to 35%.

The concentration of the other polymerisable mesogenic or liquid crystalline compounds in the polymerisable LC material is from 40 to 99%, preferably from 55 to 85%.

A +A plate or +A plate formulation according to the present invention preferably has a retardation dispersion >0.7, very preferably >0.75, most preferably >0.8, and preferably <0.98, very preferably <0.9 when measured at 0° angle of incidence.

A +A plate or +A plate formulation according to the present invention preferably has a birefringence 0.05, and preferably <0.15, very preferably <0.1, at 550 nm.

A +C plate or +C plate formulation according to the present invention preferably has a retardation dispersion >0.65, very preferably >0.75, most preferably >0.8, and preferably <0.95, very preferably <0.85 when measured at 60° angle of incidence.

A +C plate or +C plate formulation according to the present invention preferably has a birefringence ≥0.035, and preferably <0.15, very preferably <0.1, at 550 nm.

A +A plate according to the present invention preferably has a retardation from 90 to 160 nm, when measured at 0° angle of incidence.

A +C plate according to the present invention preferably has a retardation from 40 to 100 nm, when measured at 60° angle of incidence.

Above and below, "angle of incidence" means the angle relative to an axis perpendicular to the film plane. "On-axis" refers to an angle of incidence of 0°.

In the compounds of formula I, the groups $(A^1\text{-}Z^1)_m$—$U^1$—$(Z^2\text{-}A^2)_n$ and $(A^3\text{-}Z^3)_o$—$U^2$—$(Z^4\text{-}A^4)_p$, hereinafter also referred to as "mesogenic groups" do preferably exhibit a low polarizability and are preferably calamitic groups, very preferably rod-shaped groups.

The mesogenic groups in formula I are preferably comprising mainly non-aromatic, most preferably fully saturated, carbocyclic or heterocyclic groups which are connected directly or via linkage groups, wherein "mainly" means that each mesogenic group comprises more saturated rings than unsaturated or aromatic rings, and very preferably does not comprise more than one unsaturated or aromatic ring.

In the compounds of formula I, the two mesogenic groups can be identical or different from each other.

The central bitolane group in formula I with the structure

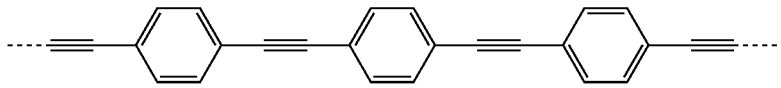

wherein the dashed lines indicate the connection to $U^1$ and $U^2$, is hereinafter also referred to as "bridging group" or B, and exhibits a high polarizability.

The aromatic groups $A^{1\text{-}4}$ in formula I may be mononuclear, i.e. having only one aromatic ring (like for example phenyl or phenylene), or polynuclear, i.e. having two or more fused rings (like for example napthyl or naphthylene). Especially preferred are mono-, bi- or tricyclic aromatic or heteroaromatic groups with up to 25 C atoms that may also comprise fused rings and are optionally substituted.

Preferred aromatic groups include, without limitation, benzene, biphenylene, triphenylene, [1,1':3',1"]terphenyl-2'-ylene, naphthalene, anthracene, binaphthylene, phenanthrene, pyrene, dihydropyrene, chrysene, perylene, tetracene, pentacene, benzpyrene, fluorene, indene, indenofluorene, spirobifluorene, etc.

Preferred heteroaromatic groups include, without limitation, 5-membered rings like pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings like pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, and fused systems like carbazole, indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, dithienopyridine, isobenzothiophene, dibenzothiophene, benzothiadiazothiophene, or combinations thereof.

The non-aromatic carbocyclic and heterocyclic groups $A^{1\text{-}4}$ in formula I include those which are saturated (also referred to as "fully saturated"), i.e. they do only contain C-atoms or hetero atoms connected by single bonds, and those which are unsaturated (also referred to as "partially saturated"), i.e. they also comprise C-atoms or hetero atoms connected by double bonds. The non-aromatic rings may also comprise one or more hetero atoms, preferably selected from Si, O, N and S.

The non-aromatic carbocyclic and heterocyclic groups may be mononuclear, i.e. having only one ring (like for example cyclohexane), or polynuclear, i.e. having two or more fused rings (like for example decahydronaphthalene or bicyclooctane). Especially preferred are fully saturated groups. Further preferred are mono-, bi- or tricyclic non-aromatic groups with up to 25 C atoms that optionally comprise fused rings and are optionally substituted. Very preferred are 5-, 6-, 7- or 8-membered carbocyclic rings wherein one or more non-adjacent C-atoms are optionally replaced by Si and/or one or more non-adjacent CH groups are optionally replaced by N and/or one or more non-adjacent $CH_2$ groups are optionally replaced by —O— and/or —S—, all of which are optionally substituted.

Preferred non-aromatic groups include, without limitation, 5-membered rings like cyclopentane, tetrahydrofuran, tetrahydrothiofuran, pyrrolidine, 6-membered rings like cyclohexane, silinane, cyclohexene, tetrahydropyran, tetrahydrothiopyran, 1,3-dioxane, 1,3-dithiane, piperidine, 7-membered rings like cycloheptane, and fused systems like bicyclo[2.2.2]octane, tetrahydronaphthalene, decahydronaphthalene, indane, or combinations thereof.

Preferably the non-aromatic and aromatic rings $A^{1\text{-}4}$ in formula I are selected from trans-1,4-cyclohexylene and 1,4-phenylene that is optionally substituted with one or more groups L.

Preferably the mesogenic groups comprise not more than one, very preferably no aromatic ring, most preferably no aromatic or unsaturated ring.

Very preferred are compounds of formula I wherein m and p are 1 and n and o are 1 or 2. Further preferred are compounds of formula I wherein m and p are 1 or 2 and n and o are 0. Further preferred are compounds wherein m, n, o and p are 2.

The groups $Z^{1\text{-}4}$ in formula I are preferably selected from —O—, —S—, —CO—, —COO—, —OCO—, —O—COO—, —CO—NR$^0$—, —NR$^0$—CO—, —NR$^0$—CO—NR$^0$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_3$—, —(CH$_2$)$_4$—, —CF$_2$CH$_2$—, —CH$_2$CF$_2$—, —CF$_2$CF$_2$—, —CH=CH—, —CY$^1$=CY$^2$—, —CH=N—, —N=CH—, —N=N—, —CH=CR$^0$—, —C≡C—, —CH=CH—COO—, —OCO—CH=CH—, CR$^0$R$^{00}$ or a single bond, very preferably from —COO—, —OCO— and a single bond.

The substituents L in formula I are preferably selected from P-Sp-, F, Cl, Br, I, —CN, —NO$_2$, —NCO, —NCS, —OCN, —SCN, —C(=O)NR$^0$R$^{00}$, —C(=O)X, —C(=O)OR$^0$, —C(=O)R$^0$, —NR$^0$R$^{00}$, —OH, —SF$_5$, optionally substituted silyl, aryl or heteroaryl with 1 to 12, preferably 1 to 6

C atoms, and straight chain or branched alkyl, alkoxy, alkylcarbonyl, alkoxycarbonyl, alkylcarbonyloxy or alkoxycarbonyloxy with 1 to 12, preferably 1 to 6 C atoms, wherein one or more H atoms are optionally replaced by F or Cl, wherein $R^O$ and $R^{OO}$ are as defined in formula I and X is halogen.

Preferred substituents are selected from F, Cl, CN, $NO_2$ or straight chain or branched alkyl, alkoxy, alkylcarbonyl, alkoxycarbonyl, alkylcarbonlyoxy or alkoxycarbonyloxy with 1 to 12 C atoms, wherein the alkyl groups are optionally perfluorinated, or P-Sp-.

Very preferred substituents are selected from F, Cl, CN, $NO_2$, $CH_3$, $C_2H_5$, $C(CH_3)_3$, $CH(CH_3)_2$, $CH_2CH(CH_3)C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$ or P-Sp-, in particular F, Cl, CN, $CH_3$, $C_2H_5$, $C(CH_3)_3$, $CH(CH_3)_2$, $OCH_3$, $COCH_3$ or $OCF_3$, most preferably F, Cl, $CH_3$, $C(CH_3)_3$, $OCH_3$ or $COCH_3$, or P-Sp-.

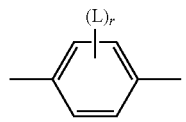

is preferably

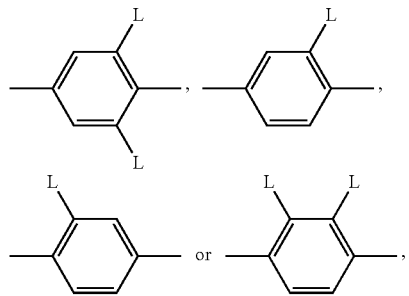

with L having each independently one of the meanings given above.

The carbyl and hydrocarbyl groups $R^{1-5}$ in formula I are preferably selected from straight-chain, branched or cyclic alkyl with 1 to 40, preferably 1 to 25 C-atoms, which is unsubstituted, mono- or polysubstituted by F, Cl, Br, I or CN, and wherein one or more non-adjacent $CH_2$ groups are optionally replaced, in each case independently from one another, by —O—, —S—, —NH—, —$NR^O$—, —$SiR^OR^{OO}$—, —CO—, —COO—, —OCO—, —O—CO—O—, —S—CO—, —CO—S—, —$SO_2$—, —CO—$NR^O$—, —$NR^O$—CO—, —$NR^O$—CO—$NR^{OO}$—, —$CY^1$=$CY^2$— or —C≡C— in such a manner that O and/or S atoms are not linked directly to one another, wherein $Y^1$ and $Y^2$ are independently of each other H, F, Cl or CN, and $R^O$ and $R^{OO}$ are independently of each other H or an optionally substituted aliphatic or aromatic hydrocarbon with 1 to 20 C atoms.

Very preferably $R^{1-5}$ in formula I are selected from, $C_1$-$C_{20}$-alkyl, $C_1$-$C_{20}$-oxaalkyl, $C_1$-$C_{20}$-alkoxy, $C_2$-$C_{20}$-alkenyl, $C_2$-$C_{20}$-alkynyl, $C_1$-$C_{20}$-thioalkyl, $C_1$-$C_{20}$-silyl, $C_1$-$C_{20}$-ester, $C_1$-$C_{20}$-amino, $C_1$-$C_{20}$-fluoroalkyl.

An alkyl or alkoxy radical, i.e. where the terminal $CH_2$ group is replaced by —O—, can be straight-chain or branched. It is preferably straight-chain, has 1, 2, 3, 4, 5, 6, 7 or 8 carbon atoms and accordingly is preferably methyl, ethyl, propyl, butyl, pentyl, hexyl, heptyl, octyl, methoxy, ethoxy, propoxy, butoxy, pentoxy, hexoxy, heptoxy, or octoxy, furthermore nonyl, decyl, undecyl, dodecyl, tridecyl, tetradecyl, pentadecyl, methoxy, nonoxy, decoxy, undecoxy, dodecoxy, tridecoxy or tetradecoxy, for example.

Oxaalkyl, i.e. where one $CH_2$ group is replaced by —O—, is preferably straight-chain 2-oxapropyl (=methoxymethyl), 2-(=ethoxymethyl) or 3-oxabutyl (=2-methoxyethyl), 2-, 3-, or 4-oxapentyl, 2-, 3-, 4-, or 5-oxahexyl, 2-, 3-, 4-, 5-, or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-, 7-, 8- or 9-oxadecyl, for example.

An alkyl group wherein one or more $CH_2$ groups are replaced by —CH=CH— can be straight-chain or branched. It is preferably straight-chain, has 2 to 10 C atoms and accordingly is preferably vinyl, prop-1-, or prop-2-enyl, but-1-, 2- or but-3-enyl, pent-1-, 2-, 3- or pent-4-enyl, hex-1-, 2-, 3-, 4- or hex-5-enyl, hept-1-, 2-, 3-, 4-, 5- or hept-6-enyl, oct-1-, 2-, 3-, 4-, 5-, 6- or oct-7-enyl, non-1-, 2-, 3-, 4-, 5-, 6-, 7- or non-8-enyl, dec-1-, 2-, 3-, 4-, 5-, 6-, 7-, 8- or dec-9-enyl.

Especially preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples for particularly preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 C atoms are generally preferred.

In an alkyl group wherein one $CH_2$ group is replaced by —O— and one by —CO—, these radicals are preferably neighboured. Accordingly these radicals together form a carbonyloxy group —CO—O— or an oxycarbonyl group —O—CO—. Preferably this group is straight-chain and has 2 to 6 C atoms. It is accordingly preferably acetyloxy, propionyloxy, butyryloxy, pentanoyloxy, hexanoyloxy, acetyloxymethyl, propionyloxymethyl, butyryloxymethyl, pentanoyloxymethyl, 2-acetyloxyethyl, 2-propionyloxy-ethyl, 2-butyryloxyethyl, 3-acetyloxypropyl, 3-propionyloxypropyl, 4-acetyloxybutyl, methoxycarbonyl, ethoxycarbonyl, propoxycarbonyl, butoxycarbonyl, pentoxycarbonyl, methoxycarbonylmethyl, ethoxy-carbonylmethyl, propoxycarbonylmethyl, butoxycarbonylmethyl, 2-(methoxycarbonyl)ethyl, 2-(ethoxycarbonyl)ethyl, 2-(propoxycarbonyl)ethyl, 3-(methoxycarbonyl)propyl, 3-(ethoxycarbonyl)propyl, 4-(methoxycarbonyl)-butyl.

An alkyl group wherein two or more $CH_2$ groups are replaced by —O— and/or —COO— can be straight-chain or branched. It is preferably straight-chain and has 3 to 12 C atoms. Accordingly it is preferably bis-carboxy-methyl, 2,2-bis-carboxy-ethyl, 3,3-bis-carboxy-propyl, 4,4-bis-carboxy-butyl, 5,5-bis-carboxy-pentyl, 6,6-bis-carboxy-hexyl, 7,7-bis-carboxy-heptyl, 8,8-bis-carboxy-octyl, 9,9-bis-carboxy-nonyl, 10,10-bis-carboxy-decyl, bis-(methoxycarbonyl)-methyl, 2,2-bis-(methoxycarbonyl)-ethyl, 3,3-bis-(methoxycarbonyl)-propyl, 4,4-bis-(methoxycarbonyl)-butyl, 5,5-bis-(methoxycarbonyl)-pentyl, 6,6-bis-(methoxycarbonyl)-hexyl, 7,7-bis-(methoxycarbonyl)-heptyl, 8,8-bis-(methoxycarbonyl)-octyl, bis-(ethoxycarbonyl)-methyl, 2,2-bis-(ethoxycarbonyl)-ethyl, 3,3-bis-(ethoxycarbonyl)-propyl, 4,4-bis-(ethoxycarbonyl)-butyl, 5,5-bis-(ethoxycarbonyl)-hexyl.

An alkyl or alkenyl group that is monosubstituted by CN or $CF_3$ is preferably straight-chain. The substitution by CN or $CF_3$ can be in any desired position.

An alkyl or alkenyl group that is at least monosubstituted by halogen is preferably straight-chain. Halogen is preferably F or Cl, in case of multiple substitution preferably F. The resulting groups include also perfluorinated groups. In case of monosubstitution the F or Cl substituent can be in any desired position, but is preferably in ω-position. Examples for especially preferred straight-chain groups with a terminal F substituent are fluoromethyl, 2-fluorethyl, 3-fluorpropyl, 4-fluorbutyl, 5-fluorpentyl, 6-fluorhexyl and 7-fluorheptyl. Other positions of F are, however, not excluded.

$R^0$ and $R^{00}$ are preferably selected from H, straight-chain or branched alkyl with 1 to 12 C atoms.

—$CY^1$=$CY^2$— is preferably —CH=CH—, —CF=CF— or —CH=C(CN)—.

Halogen is F, Cl, Br or I, preferably F or Cl.

$R^{1-5}$ can be an achiral or a chiral group. Particularly preferred chiral groups are 2-butyl (=1-methylpropyl), 2-methylbutyl, 2-methylpentyl, 3-methylpentyl, 2-ethylhexyl, 2-propylpentyl, in particular 2-methylbutyl, 2-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-hexyl, 2-octyl, 2-nonyl, 2-decyl, 2-dodecyl, 6-methoxyoctoxy, 6-methyloctoxy, 6-methyloctanoyloxy, 5-methyl heptyloxycarbonyl, 2-methylbutyryloxy, 3-methylvaleroyloxy, 4-methylhexanoyloxy, 2-chlorpropionyloxy, 2-chloro-3-methylbutyryloxy, 2-chloro-4-methylvaleryloxy, 2-chloro-3-methylvaleryloxy, 2-methyl-3-oxapentyl, 2-methyl-3-oxahexyl, 1-methoxypropyl-2-oxy, 1-ethoxypropyl-2-oxy, 1-propoxypropyl-2-oxy, 1-butoxypropyl-2-oxy, 2-fluorooctyloxy, 2-fluorodecyloxy, 1,1,1-trifluoro-2-octyloxy, 1,1,1-trifluoro-2-octyl, 2-fluoromethyloctyloxy for example. Very preferred are 2-hexyl, 2-octyl, 2-octyloxy, 1,1,1-trifluoro-2-hexyl, 1,1,1-trifluoro-2-octyl and 1,1,1-trifluoro-2-octyloxy.

Preferred achiral branched groups are isopropyl, isobutyl (=methylpropyl), isopentyl (=3-methylbutyl), isopropoxy, 2-methyl-propoxy and 3-methylbutoxy.

The polymerisable group P in formula I is a group that is capable of participating in a polymerisation reaction, like radical or ionic chain polymerisation, polyaddition or polycondensation, or capable of being grafted, for example by condensation or addition, to a polymer backbone in a polymer analogous reaction. Especially preferred are polymerisable groups for chain polymerisation reactions, like radical, cationic or anionic polymerisation. Very preferred are polymerisable groups comprising a C—C double or triple bond, and polymerisable groups capable of polymerisation by a ring-opening reaction, like oxetanes or epoxides.

Suitable and preferred polymerisable groups include, without limitation, $CH_2$=$CW^1$—COO—, $CH_2$=$CW^1$—CO—,

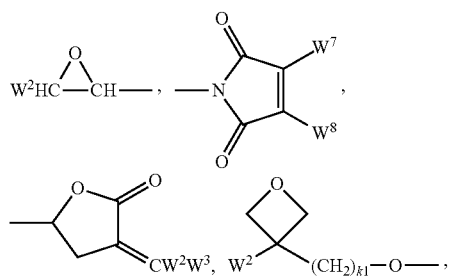

$CH_2$=$CW^2$—(O)$_{k1}$—, $CH_3$—CH=CH—O—, ($CH_2$=CH)$_2$CH—OCO—, ($CH_2$=CH—$CH_2$)$_2$CH—OCO—, ($CH_2$=CH)$_2$CH—O—, ($CH_2$=CH—$CH_2$)$_2$N—, ($CH_2$=CH—$CH_2$)$_2$N—CO—, HO—$CW^2W^3$—, HS—$CW^2W^3$—, HW$^2$N—, HO—$CW^2W^3$—NH—, $CH_2$=$CW^1$—CO—NH—, $CH_2$=CH—(COO)$_{k1}$-Phe-(O)$_{k2}$—, $CH_2$=CH—(CO)$_{k1}$-Phe-(O)$_{k2}$—, Phe-CH=CH—, HOOC—, OCN—, and $W^4W^5W^6$Si—, with $W^1$ being H, F, Cl, CN, CF$_3$, phenyl or alkyl with 1 to 5 C-atoms, in particular H, F, Cl or CH$_3$, $W^2$ and $W^3$ being independently of each other H or alkyl with 1 to 5 C-atoms, in particular H, methyl, ethyl or n-propyl, $W^4$, $W^5$ and $W^6$ being independently of each other Cl, oxaalkyl or oxacarbonylalkyl with 1 to 5 C-atoms, $W^7$ and $W^8$ being independently of each other H, Cl or alkyl with 1 to 5 C-atoms, Phe being 1,4-phenylene that is optionally substituted, preferably by one or more groups L as defined above (except for the meaning P-Sp-), and $k_1$ and $k_2$ being independently of each other 1 or 1.

Very preferred polymerisable groups are selected from $CH_2$=CH—COO—, $CH_2$=C(CH$_3$)—COO—, $CH_2$=CF—COO—, ($CH_2$=CH)$_2$CH—OCO—, ($CH_2$=CH)$_2$CH—O—,

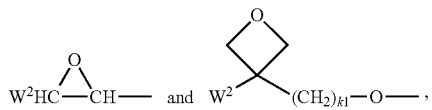

especially from acrylate, methacrylate, epoxy, oxetane and 3-ethyloxetane groups.

Polymerisation can be carried out according to methods that are known to the ordinary expert and described in the literature, for example in D. J. Broer; G. Challa; G. N. Mol, *Macromol. Chem*, 1991, 192, 59.

The term "spacer group" is known in prior art and suitable spacer groups Sp are known to the skilled person (see e.g. Pure Appl. Chem. 73(5), 888 (2001). The spacer group is preferably selected of formula Sp'-X', such that P-Sp- is P-Sp'-X'—, wherein Sp' is alkylene with 1 to 20 C atoms, preferably 1 to 12 C-atoms, which is optionally mono- or polysubstituted by F, Cl, Br, I or CN, and wherein one or more non-adjacent CH$_2$ groups are optionally replaced, in each case independently from one another, by —O—, —S—, —NH—, —NR$^0$—, —SiR$^0$R$^{00}$—, —CO—, —COO—, —OCO—, —OCO—O—, —S—CO—, —CO—S—, —NR$^0$—CO—O—, —O—CO—NR$^0$—, —NR$^0$—CO—NR$^0$—, —CH=CH— or —C≡C— in such a manner that O and/or S atoms are not linked directly to one another, X' is —O—, —S—, —CO—, —COO—, —OCO—, —O—COO—, —CO—NR$^0$—, —NR$^0$—CO—, —NR$^0$—CO—NR$^0$—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^0$—, —CY$^1$=CY$^2$—, —C≡C—, —CH=CH—COO—, —OCO—CH=CH— or a single bond, $R^0$ and $R^{00}$ are independently of each other H or alkyl with 1 to 12 C-atoms, and $Y^1$ and $Y^2$ are independently of each other H, F, Cl or CN.

X' is preferably —O—, —S—CO—, —COO—, —OCO—, —O—COO—, —CO—NR$^0$—, —NR$^0$—CO—, —NR$^0$—CO—NR$^0$— or a single bond.

Typical groups Sp' are, for example, —(CH$_2$)$_{p1}$—, —(CH$_2$CH$_2$O)$_{q1}$—CH$_2$CH$_2$—, —CH$_2$CH$_2$—S—CH$_2$CH$_2$— or —CH$_2$CH$_2$—NH—CH$_2$CH$_2$— or —(SiR$^0$R$^{00}$—O)$_{p1}$—, with p1 being an integer from 2 to 12, q1 being an integer from 1 to 3 and $R^0$ and $R^{00}$ having the meanings given above.

Preferred groups Sp' are ethylene, propylene, butylene, pentylene, hexylene, heptylene, octylene, nonylene, decylene, undecylene, dodecylene, octadecylene, ethyleneoxyethylene, methyleneoxy-butylene, ethylene-thioethylene, ethylene-N-methyl-iminoethylene, 1-methylalkylene, ethenylene, propenylene and butenylene for example. Further preferred are chiral spacer groups.

Further preferred are compounds wherein the polymerisable group is directly attached to the mesogenic group without a spacer group Sp.

In case of compounds with two or more groups P-Sp-, the polymerisable groups P can be identical to ech other or different from each other, and/or the spacer groups Sp can be identical to each other or different from each other.

In another preferred embodiment the compounds of formula I comprise one or more groups $R^{1-4}$ or $R^5$ that are substituted by two or more polymerisable groups P or P-Sp- (multifunctional polymerisable groups).

Suitable multifunctional polymerisable groups of this type are disclosed for example in U.S. Pat. No. 7,060,200 B1 oder U.S. 2006/0172090 A1. Very preferred are compounds comprising one or more multifunctional polymerisable groups selected from the following formulae:

| | |
|---|---|
| —X-alkyl-CHP$^1$—CH$_2$—CH$_2$P$^2$ | P1 |
| —X'-alkyl-C(CH$_2$P$^1$)(CH$_2$P$^2$)—CH$_2$P$^3$ | P2 |
| —X'-alkyl-CHP$^1$CHP$^2$—CH$_2$P$^3$ | P3 |
| —X'-alkyl-C(CH$_2$P$^1$)(CH$_2$P$^2$)—C$_a$H$_{2a+1}$ | P4 |
| —X'-alkyl-CHP$^1$-CH$_2$P$^2$ | P5 |
| —X'-alkyl-CHP$^1$P$^2$ | P5 |
| —X'-alkyl-CP$^1$P$^2$—C$_a$H$_{2a+1}$ | P6 |
| —X'-alkyl-C(CH$_2$P$^1$)(CH$_2$P$^2$)—CH$_2$OCH$_2$—C(CH$_2$P$^3$)(CH$_2$P$^4$)CH$_2$P$^5$ | P7 |
| —X'-alkyl-CH((CH$_2$)$_a$P$^1$)((CH$_2$)$_b$P$^2$) | P8 |
| —X'-alkyl-CHP$^1$CHP$^2$—C$_a$H$_{2a+1}$ | P9 | wherein
alkyl is straight-chain or branched alkylene having 1 to 12 C-atoms which is unsubstituted, mono- or polysubstituted by F, Cl, Br, I or CN, and wherein one or more non-adjacent CH$_2$ groups are optionally replaced, in each case independently from one another, by —O—, —S—, —NH—, —NR$^0$—, —SiR$^0$R$^{00}$—, —CO—, —COO—, —OCO—, —O—CO—O—, —S—CO—, —CO—S—, —SO$_2$—, —CO—NR$^0$—, —NR$^0$—CO—, —NR$^0$—CO—NR$^{00}$—, —CY$^1$=CY$^2$— or —C≡C— in such a manner that O and/or S atoms are not linked directly to one another, with R$^0$ and R$^{00}$ having the meanings given above, or denotes a single bond,
a and b are independently of each other 0, 1, 2, 3, 4, 5 or 6,
X' is as defined above, and
P$^{1-5}$ independently of each other have one of the meanings given for P above.

Preferred compounds of formula I are those of the following subformulae:

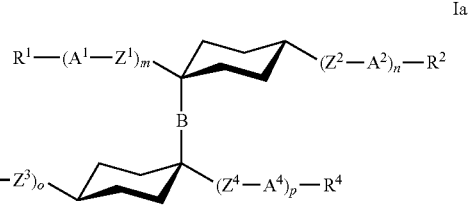

Ia

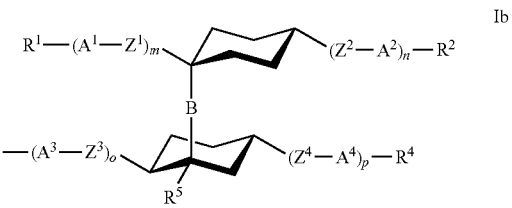

Ib

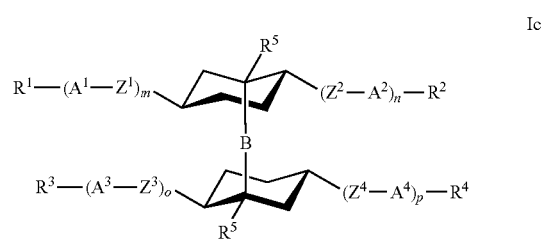

Ic

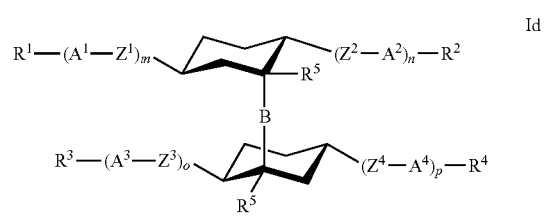

Id wherein $R^{1-5}$, $A^{1-4}$, $Z^{1-4}$, m, n, o and p have the meanings of formula I, and B is a bitolane group of the following structure (wherein the dashed lines indicate the connection to the cyxclohexyl rings in formula Ia-Id)

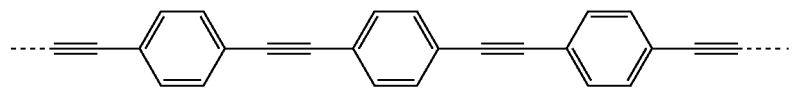

Very preferred compounds of formula I are those of the following subformulae:

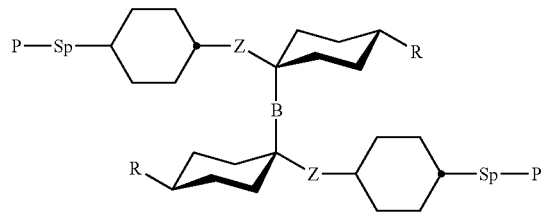

I1

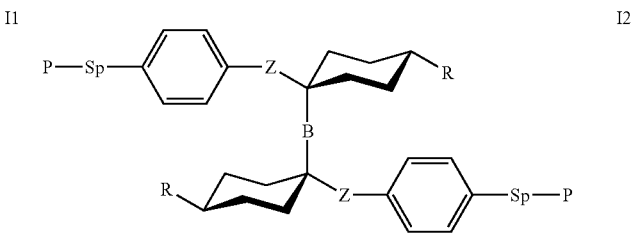

I2

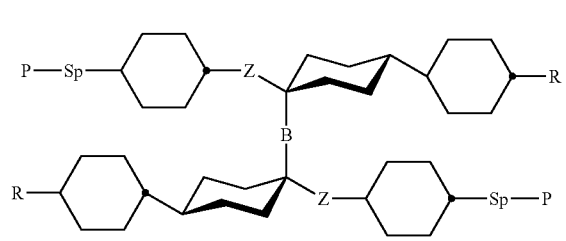

I3

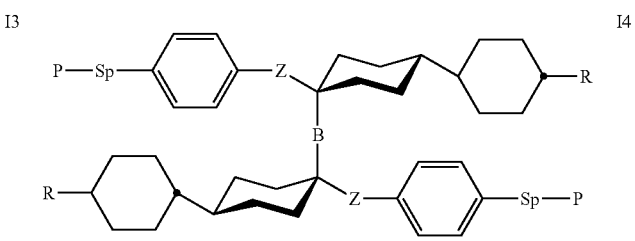

I4

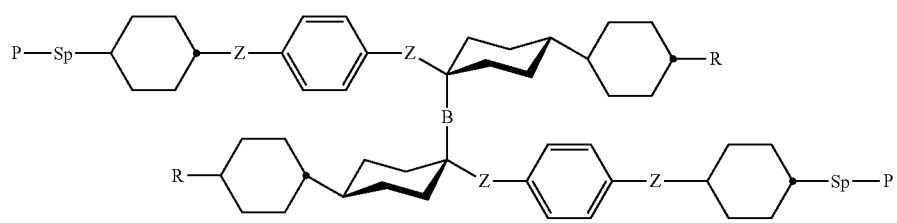

I5

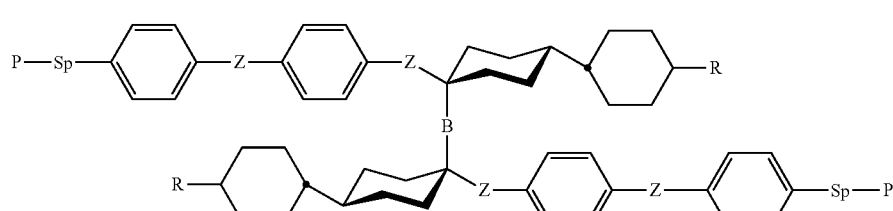

I6 wherein B is as defined above, Z has one of the meanings of $Z^1$ given in formula I, R has one of the meanings of $R^1$ as given in formula I that is different from P-Sp-, P, Sp, L and r are as defined in formula I, and the benzene rings are optionally substituted by one or more groups L as defined in formula I.

P-Sp- in these preferred compounds is preferably P-Sp'-X', with X' preferably being —O—, —COO— or —OCO—O—. Z is preferably —COO— or —OCO—.

The compounds of the following subformulae are especially preferred:

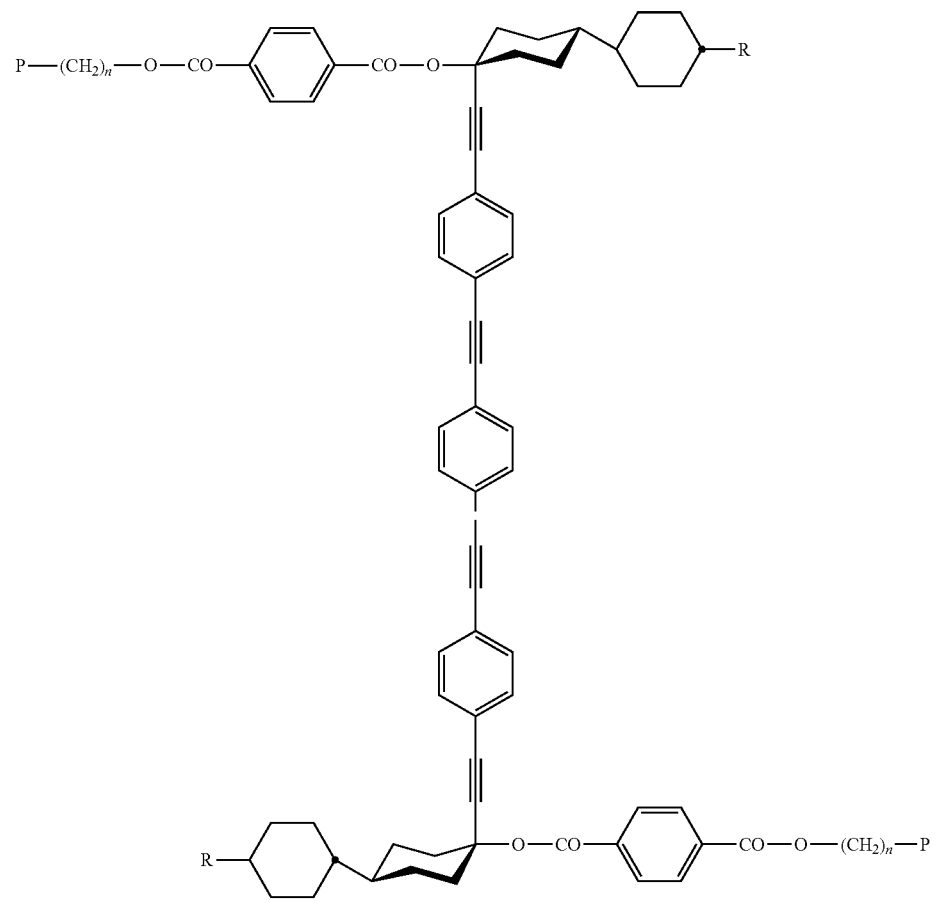
I4a
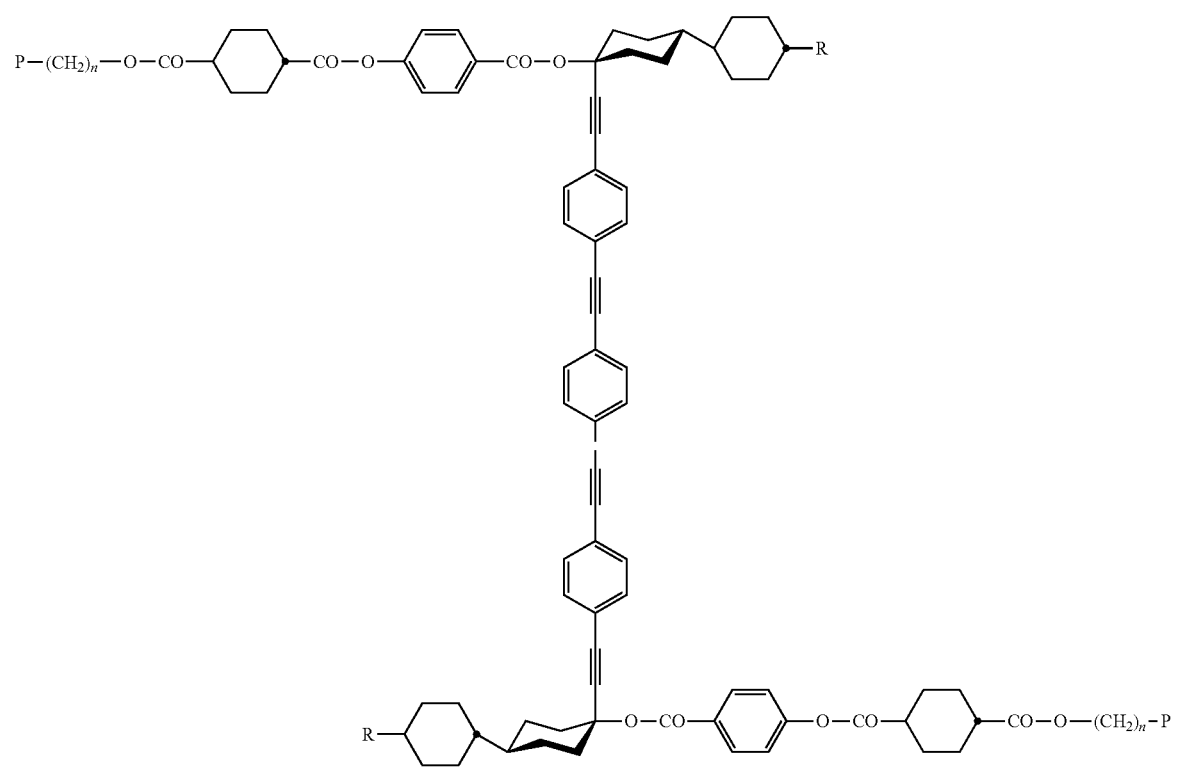
I5a

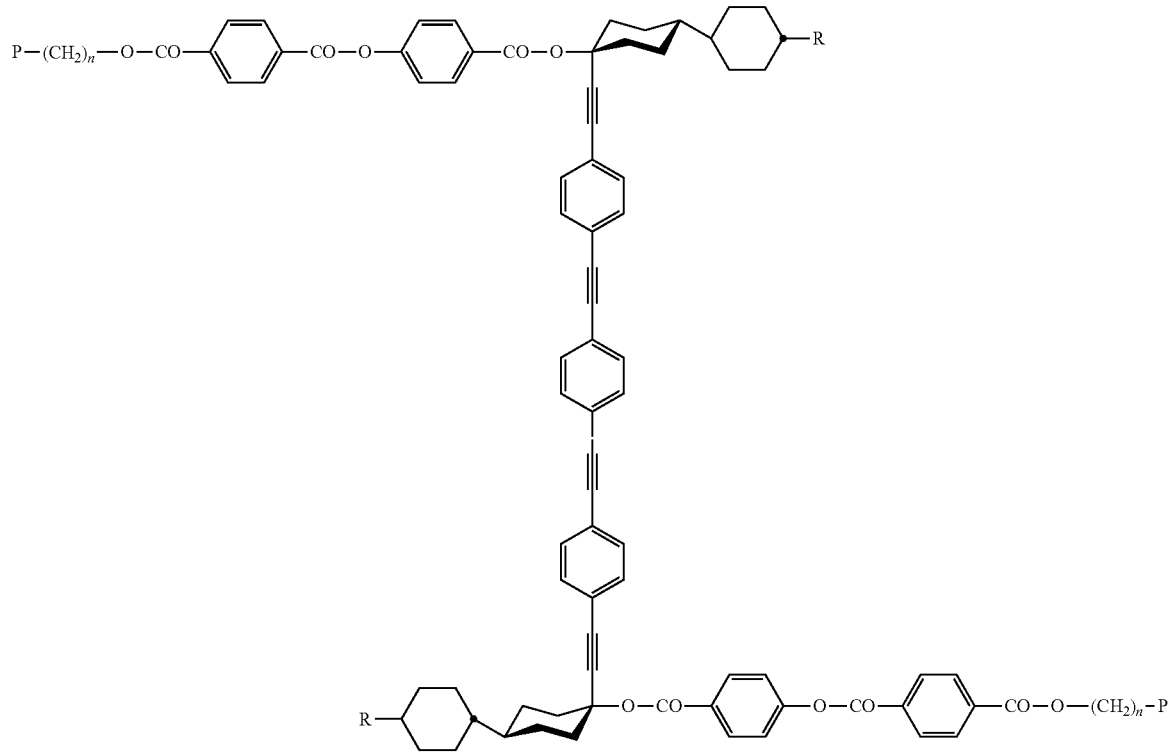

I6a wherein n is an integer from 2 to 12, preferably from 2 to 8, P and R are as defined above, the benzene rings are optionally substituted by one or more groups L as defined in formula I.

Especially preferred are compounds of the above-mentioned preferred subformulae I1-I6, I1a, I4a and I6a wherein P is an acrylate, methacrylate, epoxy or oxetane group. Further preferred are compounds of the above-mentioned preferred subformulae I1-I6, I1a, I4a and I6a wherein R is alkyl or alkoxy with 1 to 8 C-atoms, very preferably methyl, ethyl, propyl, butyl, pentyl, hexyl, methoxy, ethoxy, propoxy, butoxy, pentoxy or hexoxy.

The compounds of formula I and suitable methods for their synthesis are disclosed in WO 2008/119427 A1.

The additional polymerisable compounds in the polymerisable LC material are preferably mesogenic or liquid crystalline. Very preferably the LC material comprises one or more additional compounds selected from reactive mesogens (RMs), most preferably selected from mono- and direactive RMs. These additional compounds constitute the polymerisable LC host material.

Preferably the polymer films according to the present invention are crosslinked, and the polymerisable guest compounds and/or the polymerisable host materials comprise at least one compound with two or more polymerisable groups (di- or multireactive).

The additional RMs of the polymerizable LC host formulation can be prepared by methods which are known per se and which are described in standard works of organic chemistry like for example Houben-Weyl, Methoden der organischen Chemie, Thieme-Verlag, Stuttgart. Suitable RMs are disclosed for example in WO 93/22397, EP 0 261 712, DE 195 04 224, WO 95/22586, WO 97/00600, U.S. Pat. No. 5,518,652, U.S. Pat. No. 5,750,051, U.S. Pat. No. 5,770,107 and U.S. Pat. No. 6,514,578. Examples of particularly suitable and preferred RMs are shown in the following list.

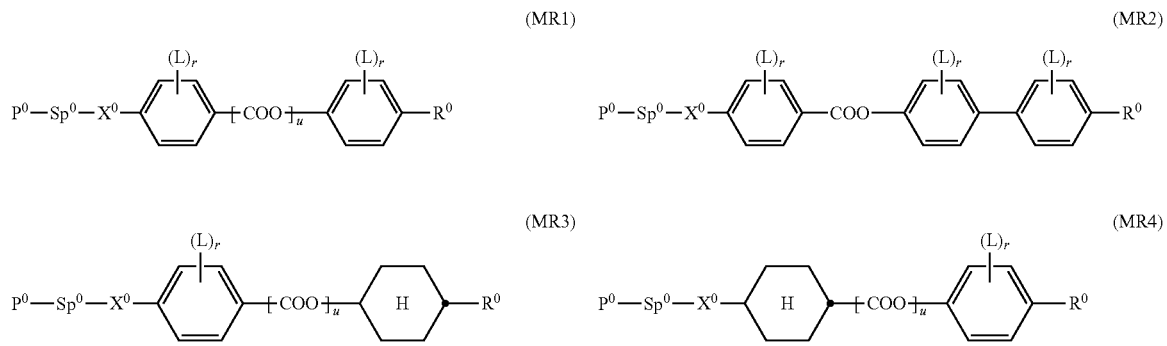

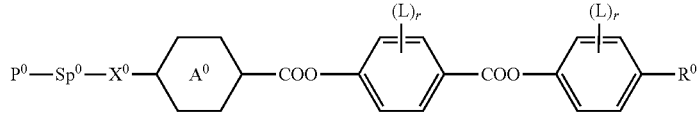 (MR5)
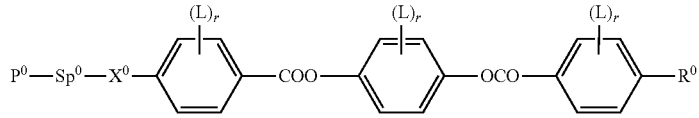 (MR6)
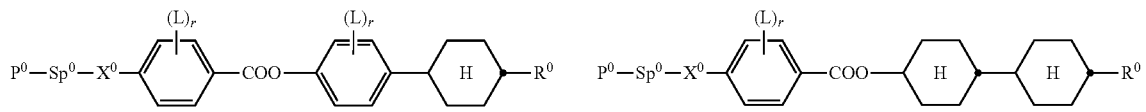 (MR7) (MR8)
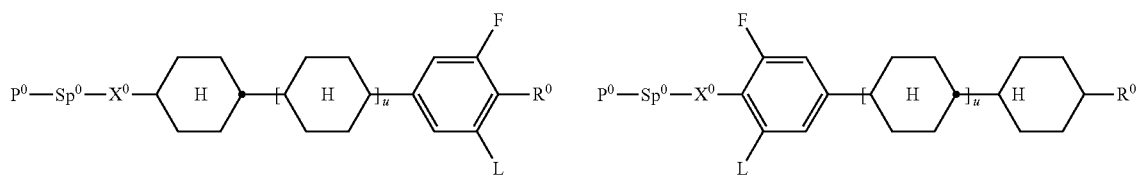 (MR9) (MR10)
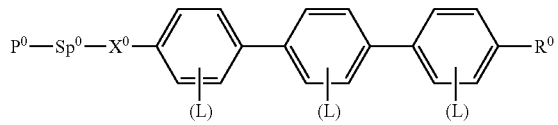 (MR11)
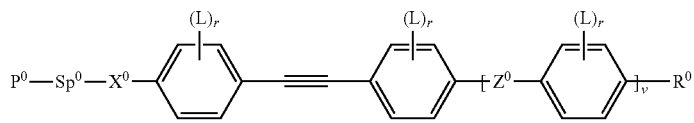 (MR12)
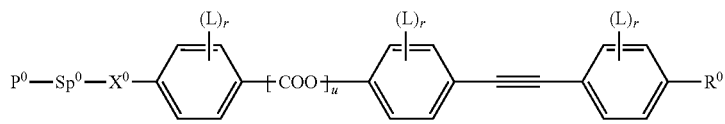 (MR13)
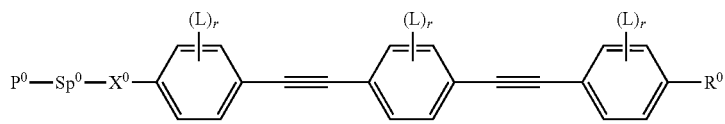 (MR14)
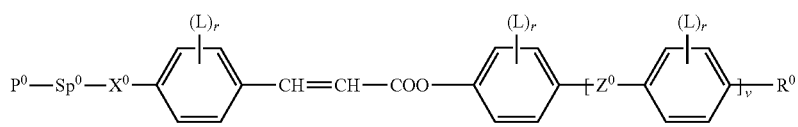 (MR15)
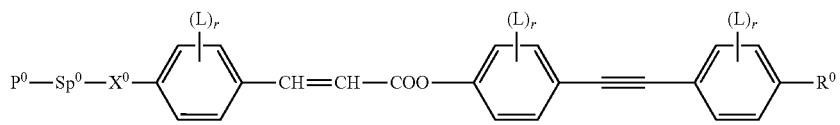 (MR16)
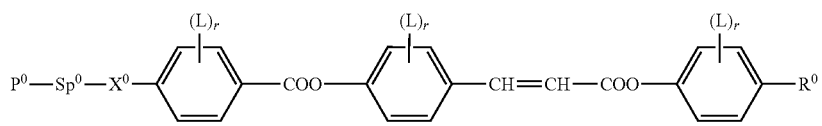 (MR17)

(MR18)
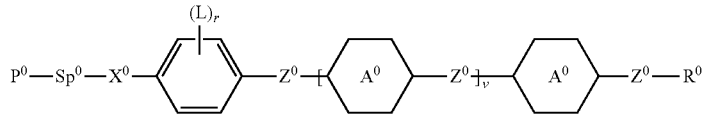
(MR19)
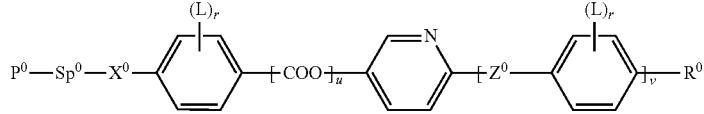
(MR20)
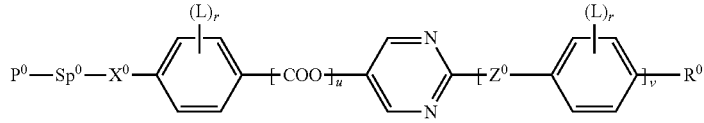
(MR21)
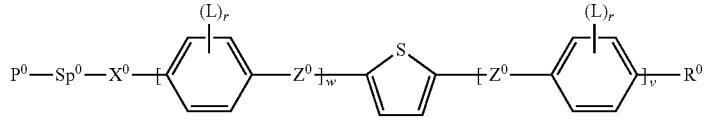
(MR22)
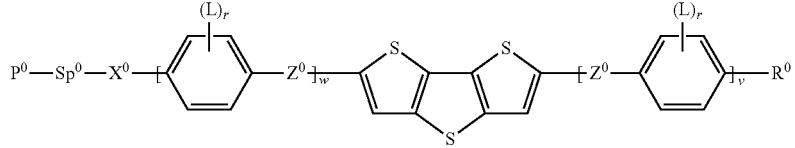
(MR23)
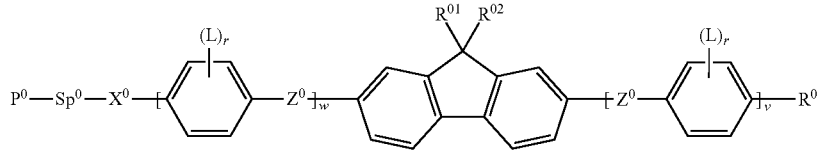
(MR24)
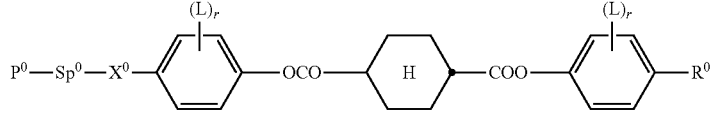
(MR25)
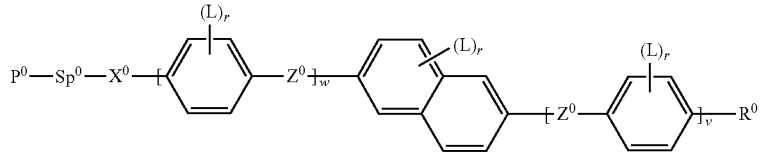
(MR26)
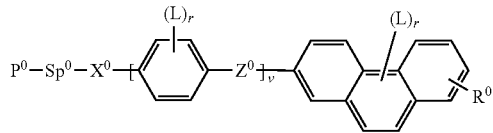
(MR27)
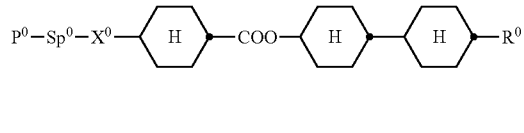
(MR28)
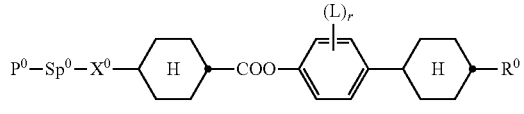
(MR29)
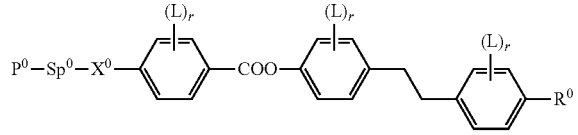

(MR30)
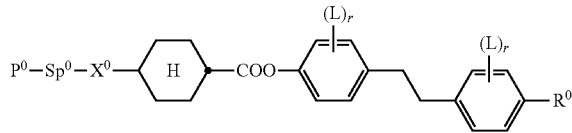
(DR1)
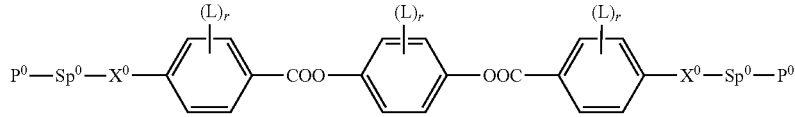
(DR2)
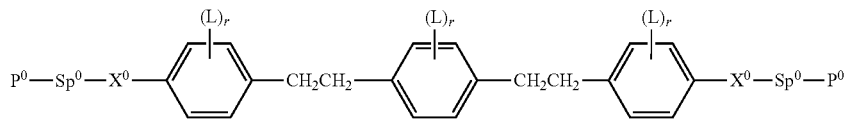
(DR3)
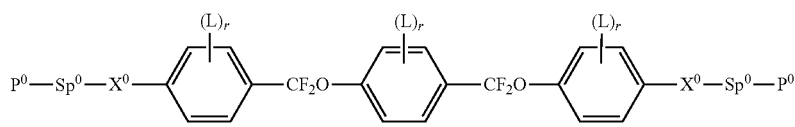
(DR4)
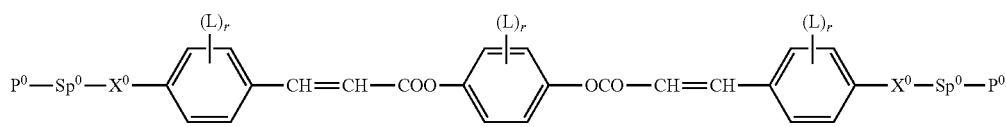
(DR5)
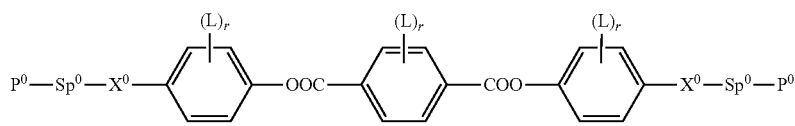
(DR6)
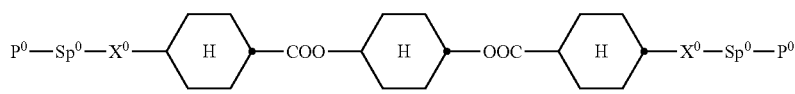
(DR7)
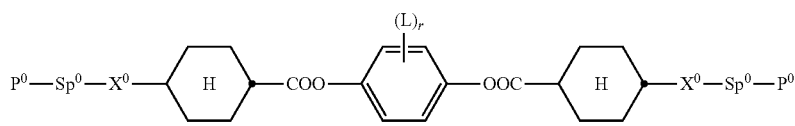
(DR8)
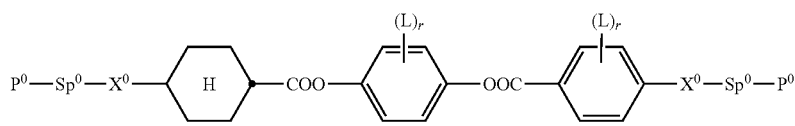
(DR9)
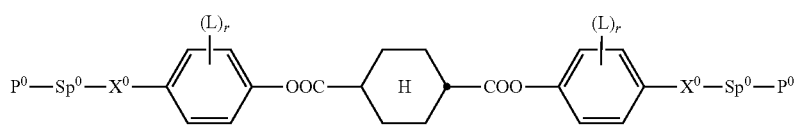
(DR10)
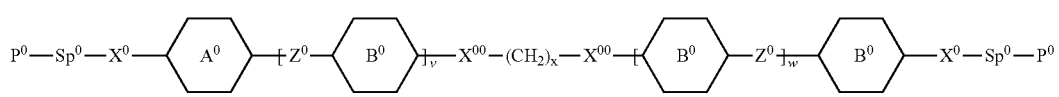
(CR1)
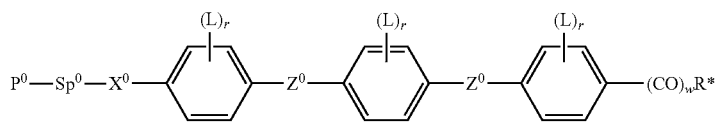

-continued

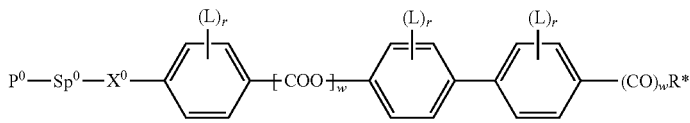
(CR2)

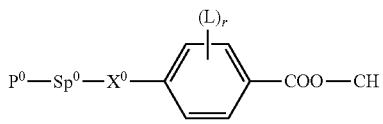
(CR3)

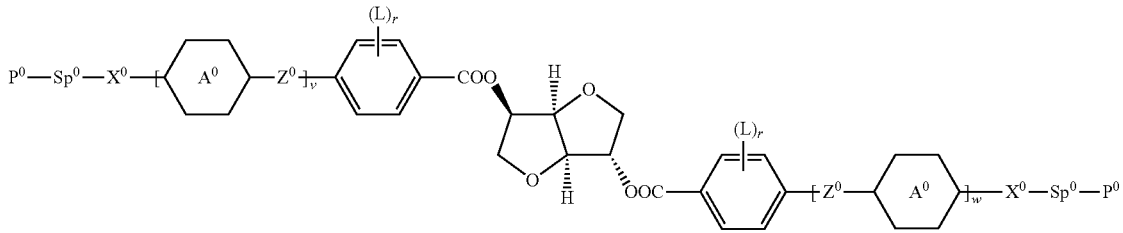
(CR4)

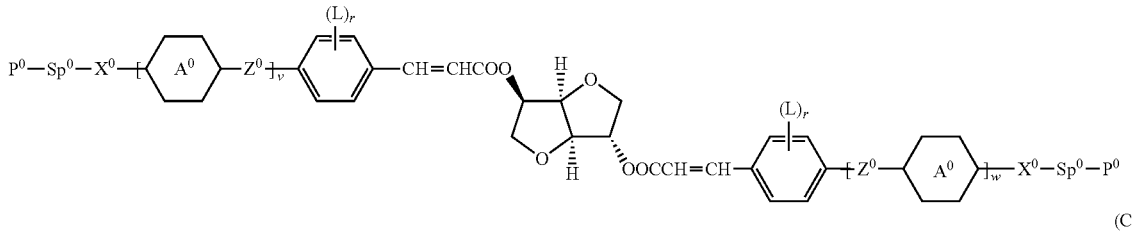
(CR5)

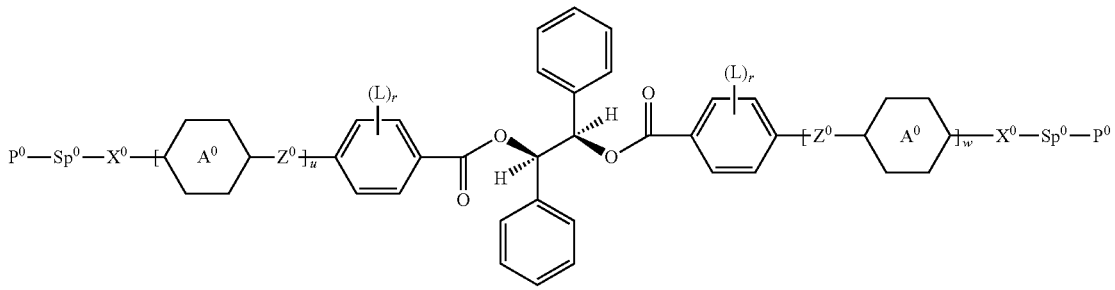
(CR6)

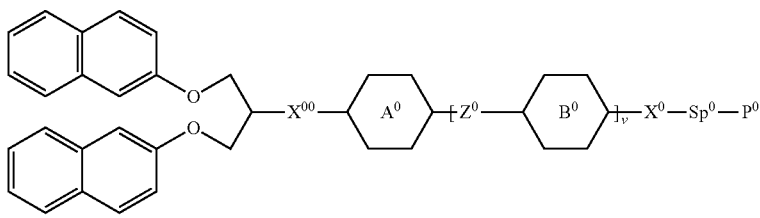
(CR7)

wherein

P⁰ is, in case of multiple occurrence independently of one another, a polymerizable group having one of the meanings given for P above, and is preferably an acryl, methacryl, oxetane, 3-ethyloxetane, epoxy, vinyloxy or styrene group, Sp⁰ is a spacer group having one of the meanings given for Sp' above, X⁰ has one of the meanings given for X' above, Sp⁰-X⁰ is preferably selected from —$(CH_2)_{p1}$—, —$(CH_2)_{p1}$—O—, —$(CH_2)_{p1}$—CO—O— and —$(CH_2)_{p1}$—O—CO—O—, wherein p1 is an integer from 1 to 12 and wherein these groups are linked to an adjacent ring via the O-atom if present, A⁰ and B⁰ are, in case of multiple occurrence independently of one another, 1,4-phenylene that is optionally substituted with 1, 2, 3 or 4 groups L, or trans-1,4-cyclohexylene, Z⁰ is, in case of multiple occurrence independently of one another, —COO—, —OCO—, —CH₂CH₂—, —C≡C—, —CH=CH—, —CH=CH—COO—, —OCO—CH=CH— or a single bond, $R^0$ is alkyl, alkoxy, thioalkyl, alkylcarbonyl, alkoxycarbonyl, alkylcarbonyloxy or alkoxycarbonyloxy with 1 to 20, preferably 1 to 15 C atoms which is optionally fluorinated, or denotes $Y^0$ or P-Sp$^0$-X$^0$—, $Y^0$ is F, Cl, ON, $NO_2$, $OCH_3$, OCN, SON, $SF_5$, optionally fluorinated alkylcarbonyl, alkoxycarbonyl, alkylcarbonyloxy or alkoxycarbonyloxy with 1 to 4 C atoms, or mono- oligo- or polyfluorinated alkyl or alkoxy with 1 to 4 C atoms, $X^{00}$ is —O—, —S—, —CO—, —COO—, —OCO—, —O—COO—, —CO—$NR^{01}$—, —$NR^{01}$—CO—, —$NR^{01}$—CO—$NR^{01}$—, —$OCH_2$—, —$CH_2O$—, —$SCH_2$—, —$CH_2S$—, —$CF_2O$—, —$OCF_2$—, —$CF_2S$—, —$SCF_2$—, —$CF_2CH_2$—, —$CH_2CF_2$—, —$CF_2CF_2$—, —CH=N—, —N=CH—, —N=N—, —CH=$CR^{01}$—, —CF=CF—, —C≡C—, —CH=CH—COO—, —OCO—CH=CH— or a single bond $R^{01}$ is H or alkyl with 1 to 12 C-atoms, R* is a chiral alkyl or alkoxy group with 4 or more, preferably 4 to 12 C atoms, like 2-methylbutyl, 2-methyloctyl, 2-methylbutoxy or 2-methyloctoxy, Ch is a chiral group selected from cholesteryl, estradiol, or terpenoid radicals like menthyl or citronellyl, L is, in case of multiple occurrence identically or differently F, Cl, CN, SCN, $SF_5$ or straight-chain or branched, optionally mono- or polyfluorinated alkyl, alkoxy, alkenyl, alkynyl, alkylcarbonyl, alkoxycarbonyl, or alkylcarbonyloxy or alkoxycarbonyloxy having 1 to 12 C atoms, (wherein the groups different from alkyl and alkoxy contain at least 2 C atoms and branched groups contain at least 3 C atoms) or optionally halogenated alkyl, alkoxy, alkylcarbonyl, alkoxycarbonyl, alkylcarbonyloxy or alkoxycarbonyloxy with 1 to 5 C atoms, r is 0, 1, 2, 3 or 4, u is 0 or 1, v and v are independently of each other 0, 1 or 2, and wherein the benzene and napthalene rings can additionally be substituted with one or more identical or different groups L.

Especially preferably the polymerizable LC host component contains only achiral compounds and no chiral compounds.

Further preferably the polymerizable LC host component comprises one or more componds selected from the group consisting of formule MR3, MR4, MR7, MR8, MR9, MR10, MR18, MR27, MR28, DR1, DR5, DR6, DR7, DR8, DR9 and DR10.

Further preferably the polymerizable LC host component comprises one or more compounds selected from the following formulae:

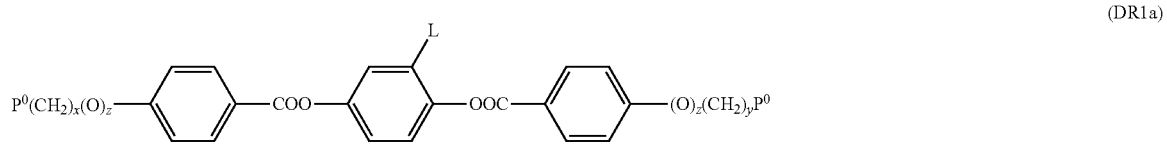
(DR1a)

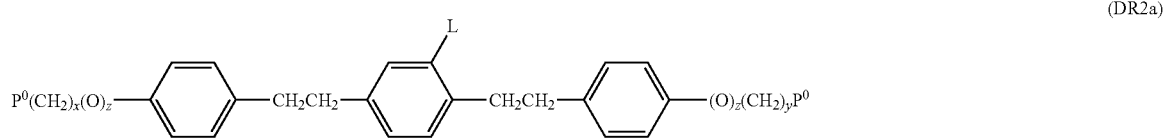
(DR2a)

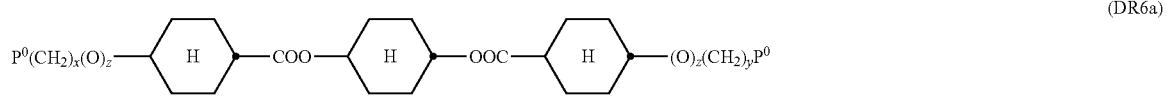
(DR6a)

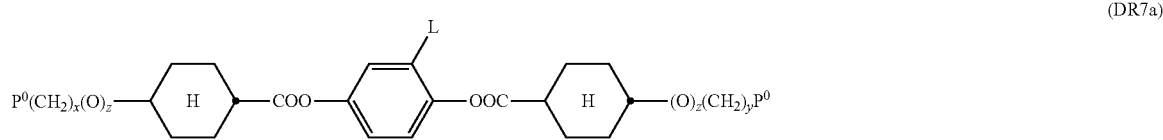
(DR7a)

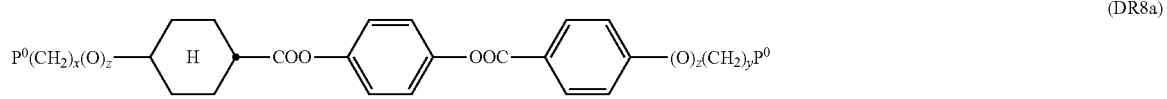
(DR8a)

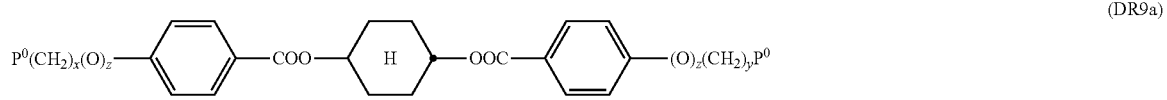
(DR9a)

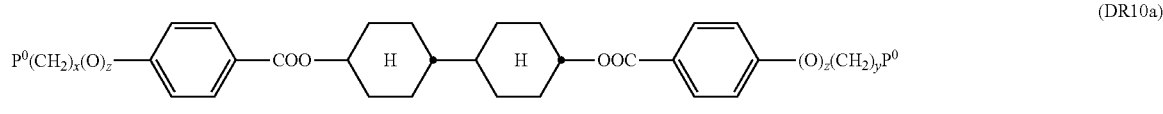
(DR10a)

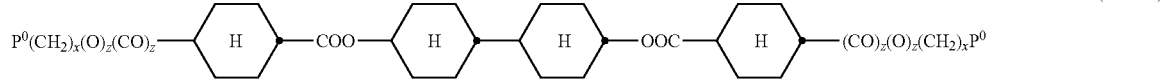
(DR10b)

-continued

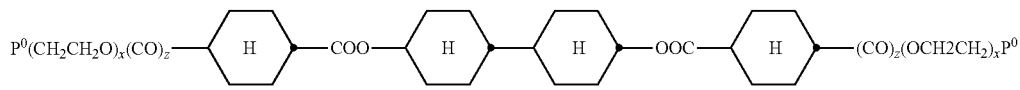
(DR10c)

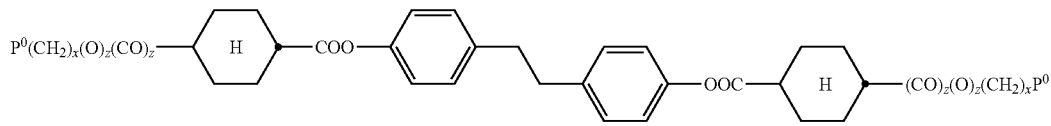
(DR10d)

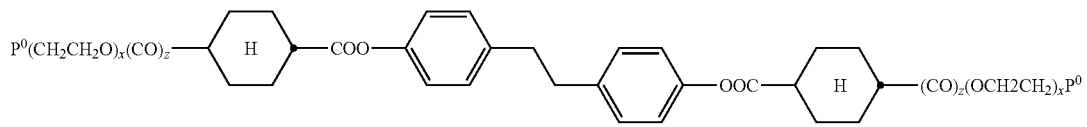
(DR10e)

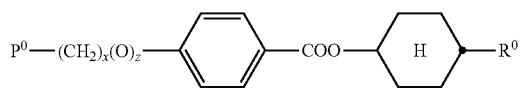
(MR3a)

(MR3b)

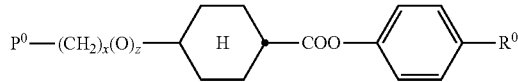
(MR4a)

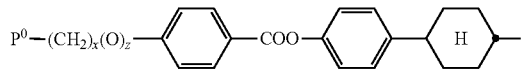
(MR7a)

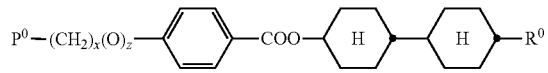
(MR8a)

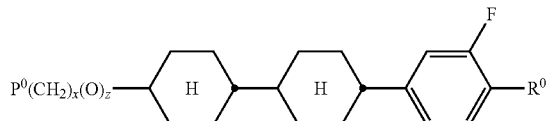
(MR9a)

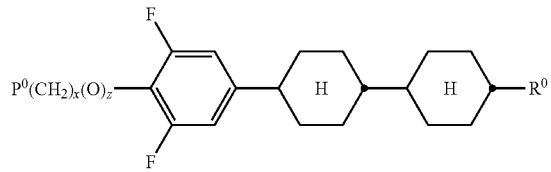
(MR10a)

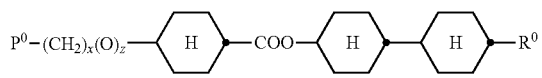
(MR27a)

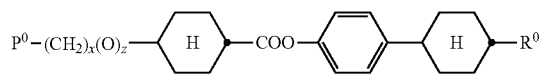
(MR28a)

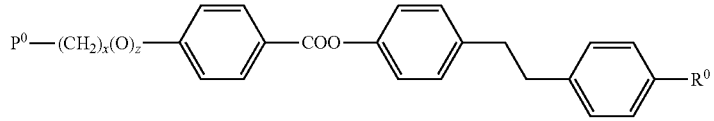
(MR29a)

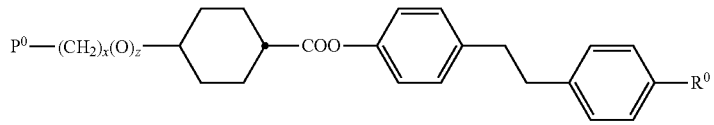
(MR30a)

wherein $P^0$ and $R^0$ are as defined above, $R^0$ is preferably alkyl, alkoxy or alkylcarbonyloxy with 1 to 6 C-atoms, L is H or CH$_3$, x and y are independently of each other 0 or identical or different integers from 1 to 12, z is on each occurrence independently of one another 0 or 1, with z being 0 if the adjacent x or y is 0.

Further preferably the polymerizable LC host component comprises one or more compounds selected from the following formulae:

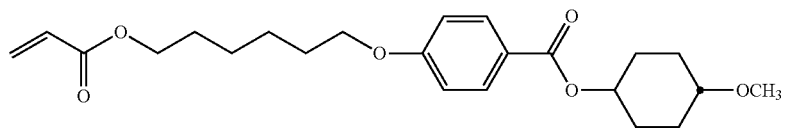
(MR3a1)
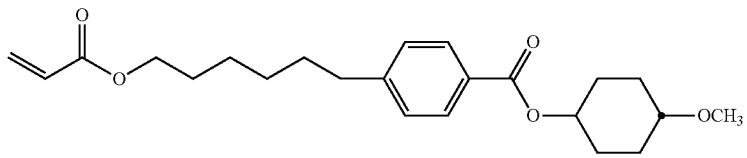
(MR3a2)
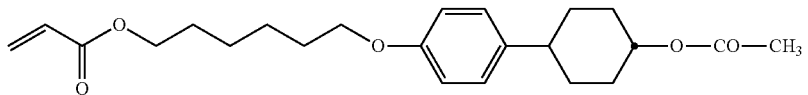
(MR3b1)
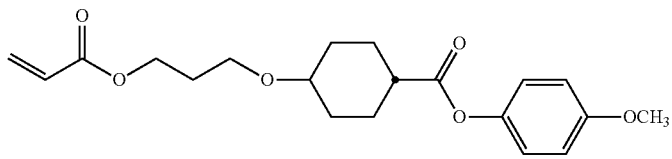
(MR4a1)
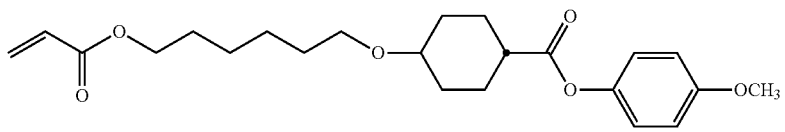
(MR4a2)
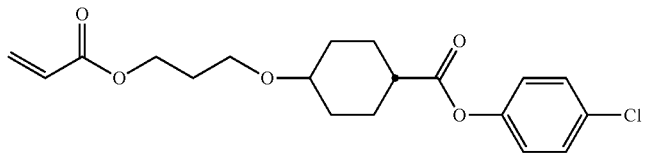
(MR4a3)
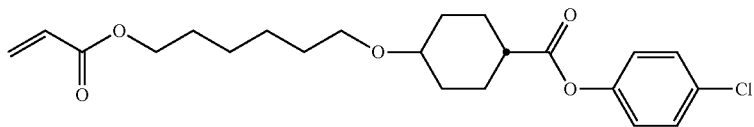
(MR4a4)
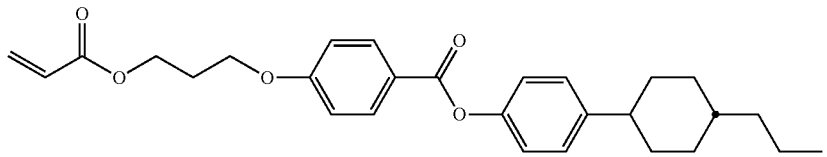
(MR7a1)
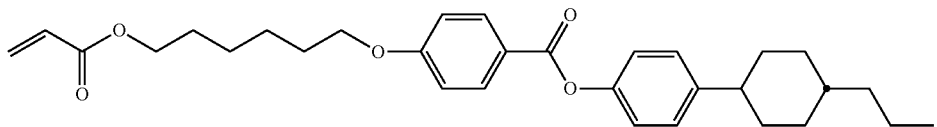
(MR7a2)
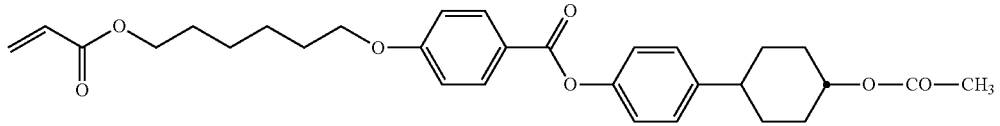
(MR7a3)

-continued
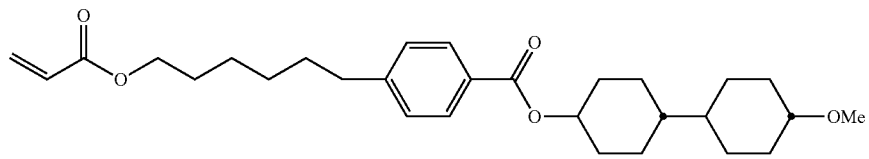
(MR8a1)
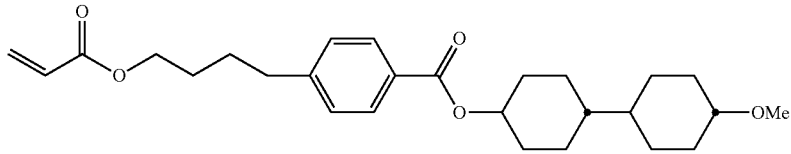
(MR8a2)
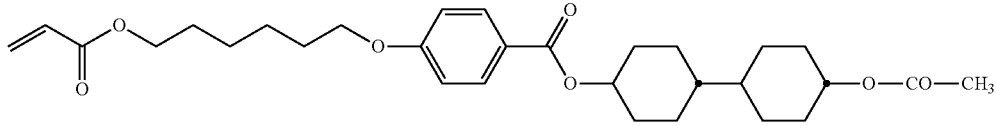
(MR8a3)
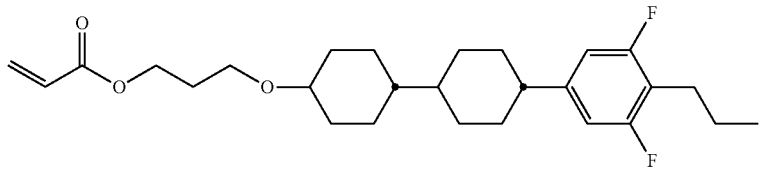
(MR9a1)
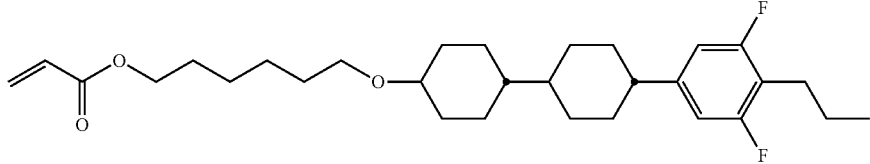
(MR9a2)
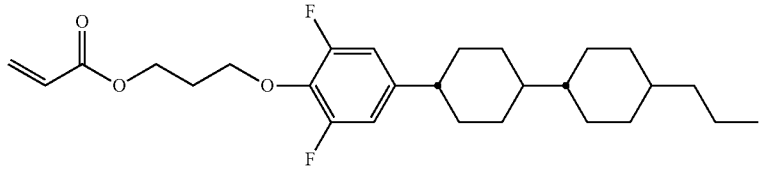
(MR10a1)
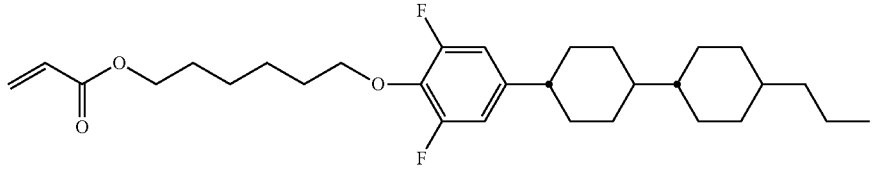
(MR10a2)
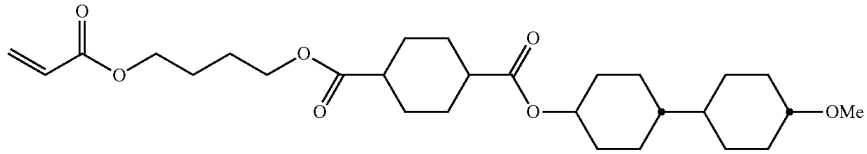
(MR27a1)
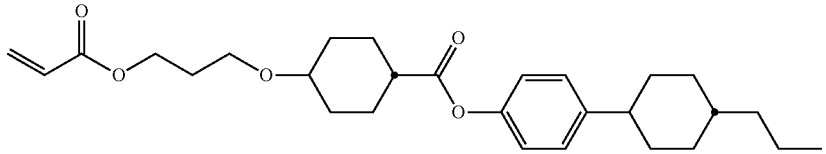
(MR28a1)

(MR28a2)
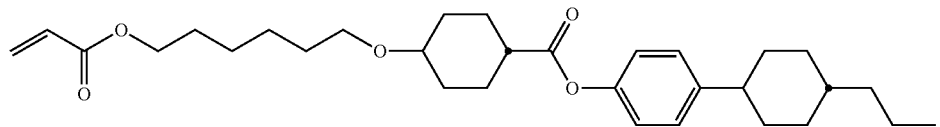
(MR29a1)
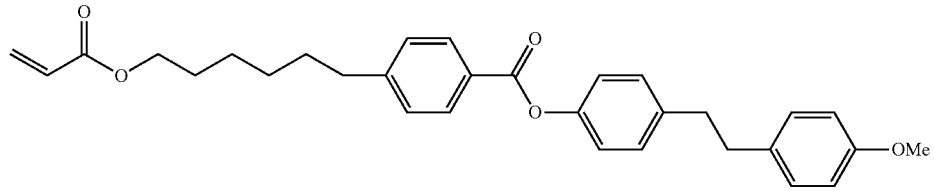
(MR30a1)
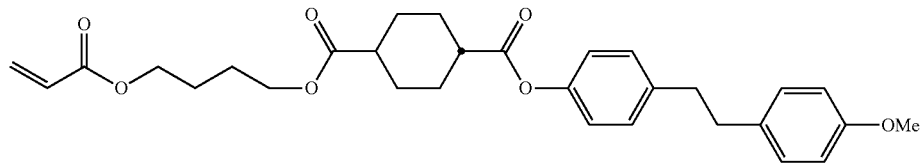
(DR1a1)
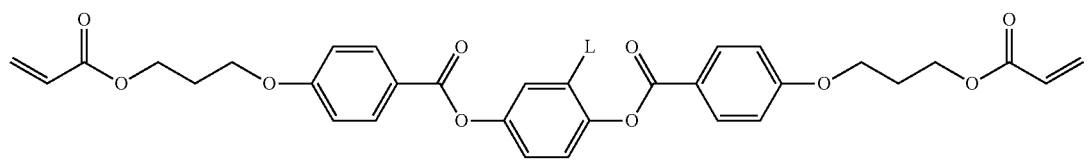
(DR1a2)
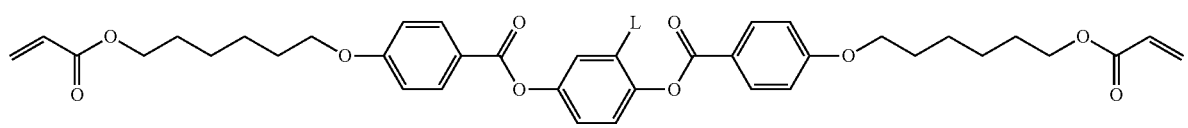
(DR1a3)
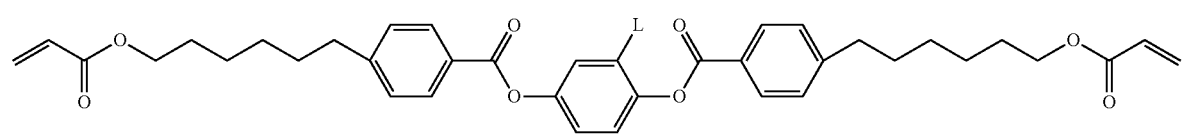
(DR1a4)
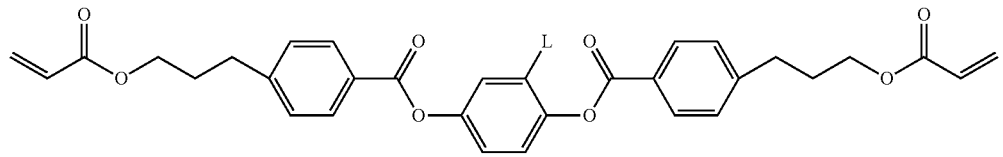
(DR1a5)
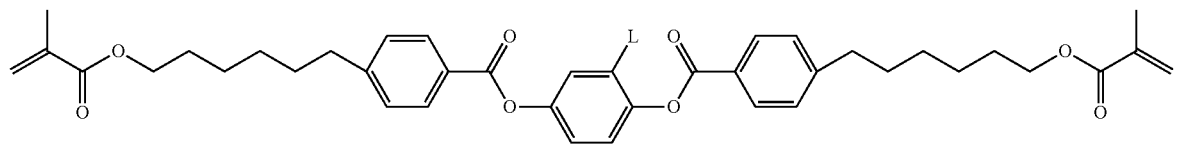
(DR2a1)
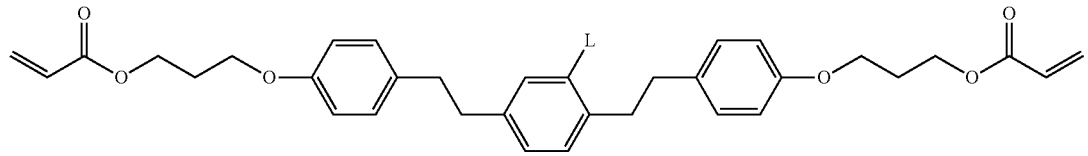

-continued
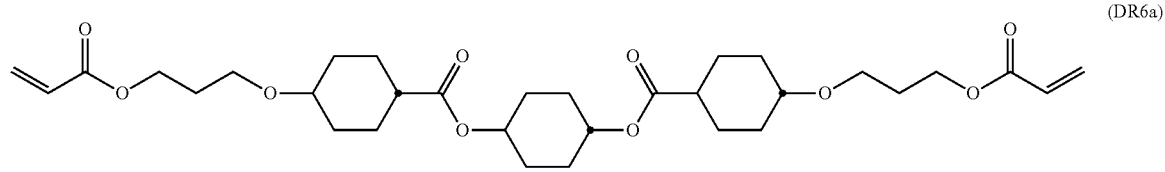
(DR6a)
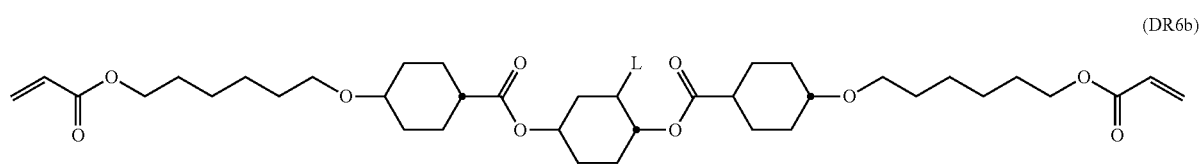
(DR6b)
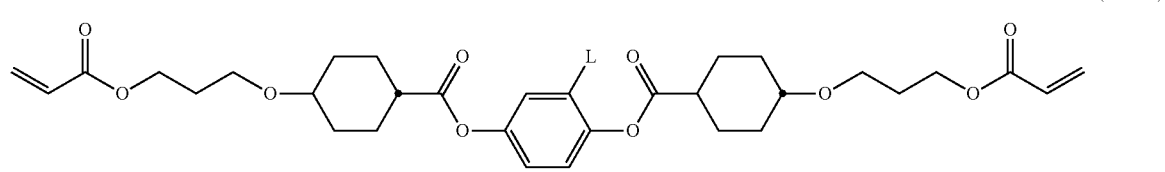
(DR7a1)
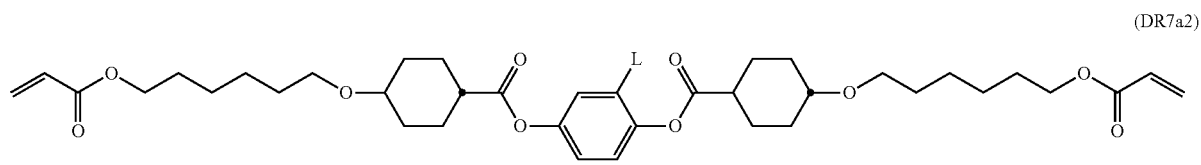
(DR7a2)
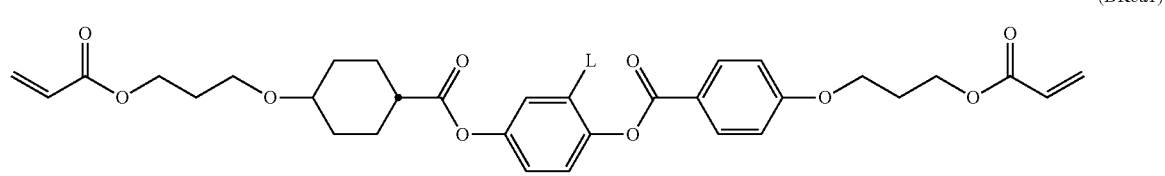
(DR8a1)
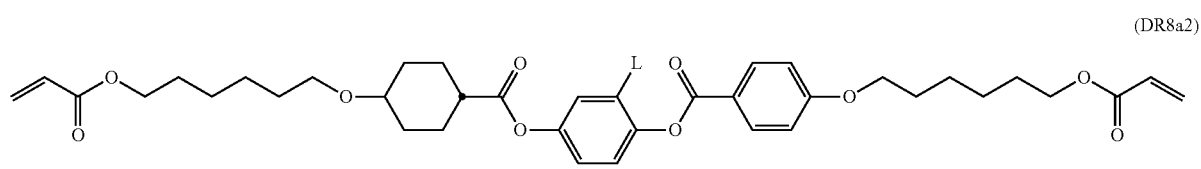
(DR8a2)
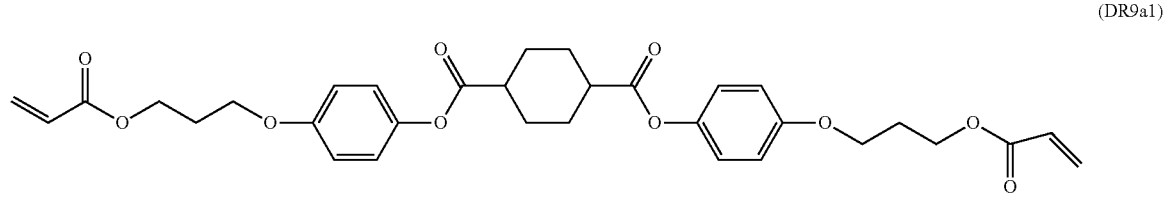
(DR9a1)
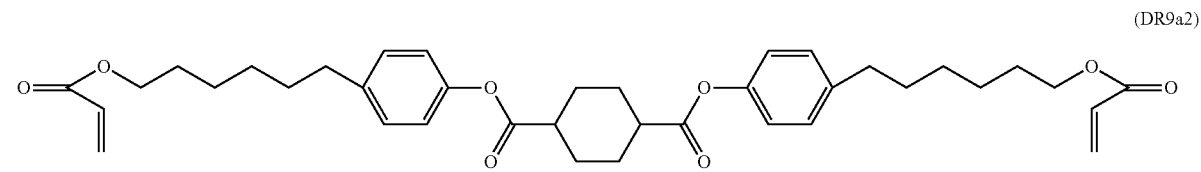
(DR9a2)
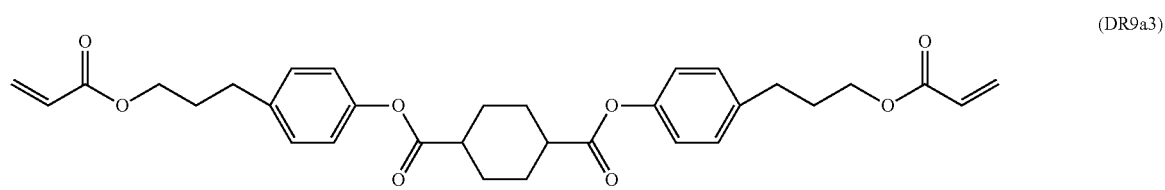
(DR9a3)

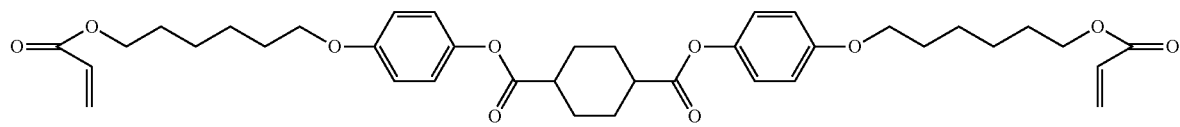
(DR9a4)
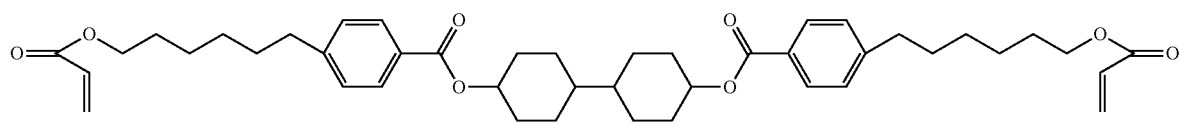
(DR10a1)
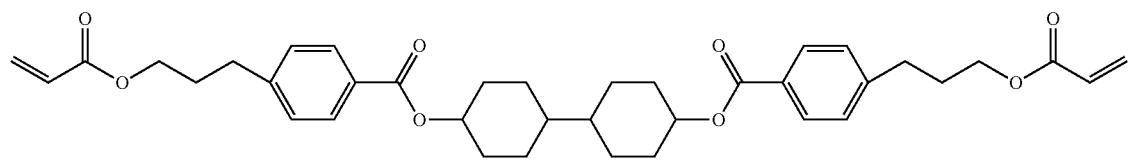
(DR10a2)
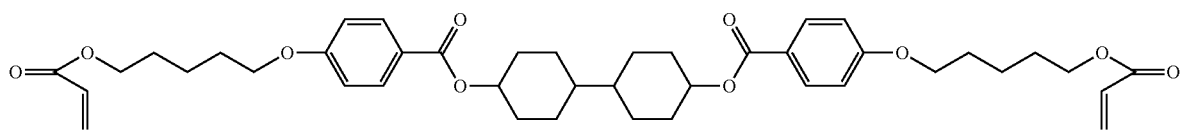
(DR10a3)
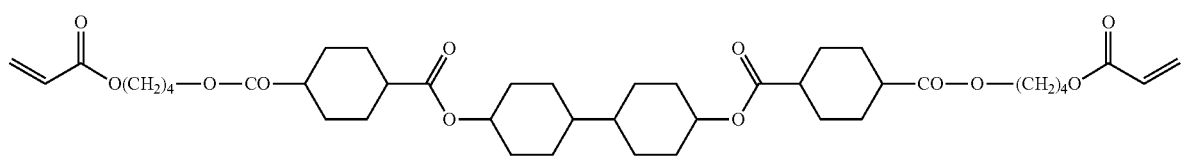
(DR10b1)
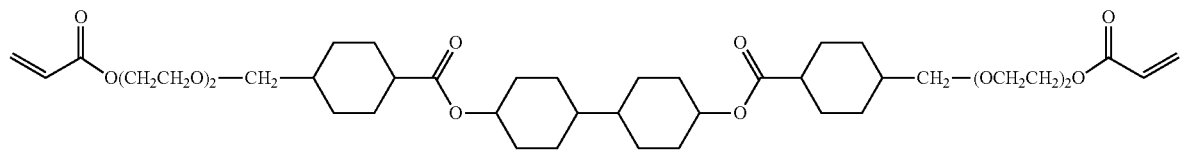
(DR10c1)
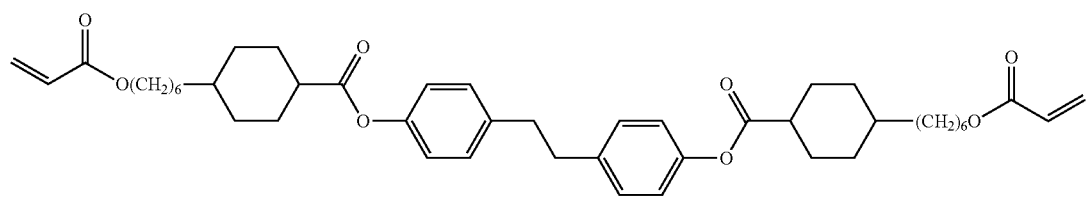
(DR10d1)
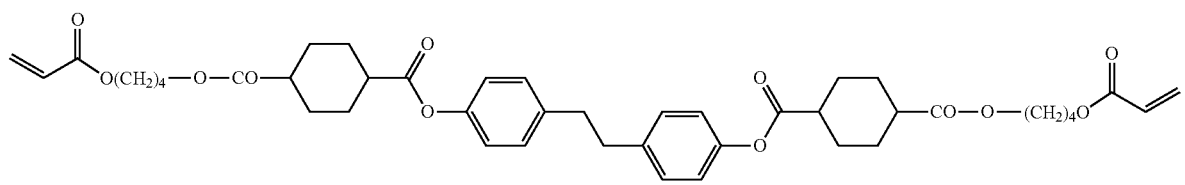
(DR10d2)

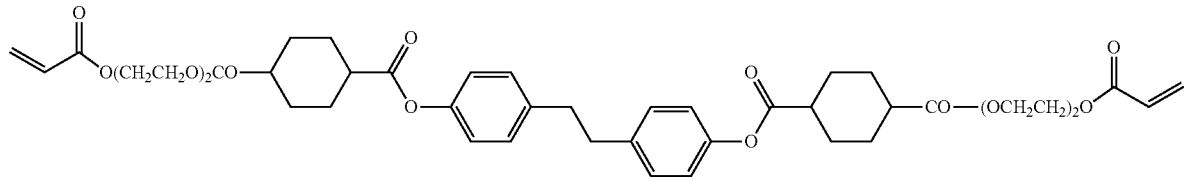

(DR10e1)

wherein L is H or CH$_3$.

The aforementioned RMs and their synthesis are known from prior art. For example, compounds DR1a1 and DR1a2 are described in D. J. Broer; G. Challa; G. N. Mol, *Macromol. Chem*, 1991, 192, 59, compounds MR10a1 and MR10a2 are described in U.S. Pat. No. 6,183,822, and compounds MR7a1 and MR7a2 are described in U.S. Pat. No. 5,720,900.

Preferably the polymerisable compounds of the polymerisable LC host material are selected from compounds, very preferably mono- or direactive RMs, having low birefringence.

Especially preferred is a polymerisable host material having an absolute value of the birefringence from 0.01 to 0.2, very preferably from 0.04 to 0.16.

The general preparation of polymer LC films according to this invention is known to the ordinary expert and described in the literature, for example in D. J. Broer; G. Challa; G. N. Mol, *Macromol. Chem*, 1991, 192, 59. Typically a polymerisable LC material is coated or otherwise applied onto a substrate where it aligns into uniform orientation, and polymerised in situ in its LC phase at a selected temperature for example by exposure to heat or actinic radiation, preferably by photo-polymerisation, very preferably by UV-photopolymerisation, to fix the alignment of the LC molecules. If necessary, uniform alignment can promoted by additional means like shearing or annealing the LC material, surface treatment of the substrate, or adding surfactants to the LC material.

As substrate for example glass or quartz sheets or plastic films can be used. It is also possible to put a second substrate on top of the coated material prior to and/or during and/or after polymerisation. The substrates can be removed after polymerisation or not. When using two substrates in case of curing by actinic radiation, at least one substrate has to be transmissive for the actinic radiation used for the polymerisation. Isotropic or birefringent substrates can be used. In case the substrate is not removed from the polymerised film after polymerisation, preferably isotropic substrates are used.

Suitable and preferred plastic substrates are for example films of polyester such as polyethyleneterephthalate (PET) or polyethylene-naphthalate (PEN), polyvinylalcohol (PVA), polycarbonate (PC) or triacetylcellulose (TAC), very preferably PET or TAC films. As birefringent substrates for example uniaxially stretched plastics film can be used. PET films are commercially available for example from DuPont Teijin Films under the trade name Melinex®.

The polymerisable material can be applied onto the substrate by conventional coating techniques like spin-coating or blade coating. It can also be applied to the substrate by conventional printing techniques which are known to the expert, like for example screen printing, offset printing, reel-to-reel printing, letter press printing, gravure printing, rotogravure printing, flexographic printing, intaglio printing, pad printing, heat-seal printing, ink-jet printing or printing by means of a stamp or printing plate.

It is also possible to dissolve the polymerisable material in a suitable solvent. This solution is then coated or printed onto the substrate, for example by spin-coating or printing or other known techniques, and the solvent is evaporated off before polymerisation. In many cases it is suitable to heat the mixture in order to facilitate the evaporation of the solvent. As solvents for example standard organic solvents can be used. The solvents can be selected for example from ketones such as acetone, methyl ethyl ketone, methyl propyl ketone or cyclohexanone; acetates such as methyl, ethyl or butyl acetate or methyl acetoacetate; alcohols such as methanol, ethanol or isopropyl alcohol; aromatic solvents such as toluene or xylene; halogenated hydrocarbons such as di- or trichloromethane; glycols or their esters such as PGMEA (propyl glycol monomethyl ether acetate), y-butyrolactone, and the like. It is also possible to use binary, ternary or higher mixtures of the above solvents.

Uniform alignment of the polymerisable LC material, for example planar alignment (for preparing A plates) or homeotropic, i.e. perpendicular alignment (for preparing C plates) can be achieved for example by rubbing treatment of the substrate, by shearing the material during or after coating, by annealing the material before polymerisation, by application of an alignment layer, by applying a magnetic or electric field to the coated material, or by the addition of surface-active compounds to the material. Reviews of alignment techniques are given for example by I. Sage in "Thermotropic Liquid Crystals", edited by G. W. Gray, John Wiley & Sons, 1987, pages 75-77; and by T. Uchida and H. Seki in "Liquid Crystals—Applications and Uses Vol. 3", edited by B. Bahadur, World Scientific Publishing, Singapore 1992, pages 1-63. A review of alignment materials and techniques is given by J. Cognard, Mol. Cryst. Liq. Cryst. 78, Supplement 1 (1981), pages 1-77.

Especially preferred is a polymerisable material comprising one or more surfactants that promote a specific surface alignment of the LC molecules. Suitable surfactants are described for example in J. Cognard, Mol. Cryst. Liq. Cryst. 78, Supplement 1, 1-77 (1981). Preferred aligning agents for planar alignment are for example non-ionic surfactants, preferably fluoro-carbon surfactants such as the commercially available Fluorad FC-171® (from 3M Co.) or Zonyl FSN® (from DuPont), multiblock surfactants as described in GB 2 383 040 or polymerisable surfactants as described in EP 1 256 617. Preferably the total concentration of surfactants in the polymerisable LC material is from 0.05 to 3%, very preferably from 0.1 to 1%.

It is also possible to apply an alignment layer onto the substrate and provide the polymerisable material onto this alignment layer. Suitable alignment layers are known in the art, like for example rubbed polyimide or alignment layers prepared by photoalignment as described in U.S. Pat. No. 5,602,661, U.S. Pat. No. 5,389,698 or U.S. Pat. No. 6,717,644.

Rubbed polyimide (PI) can for example be used to induce planar alignment, whereas an untreated glass substrate can for example be used to induce homeotropic alignment.

It is also possible to induce or improve alignment by annealing the polymerisable LC material at elevated temperature, preferably at its polymerisation temperature, prior to polymerisation.

Polymerisation is achieved for example by exposing the polymerisable material to heat or actinic radiation. Actinic radiation means irradiation with light, like UV light, IR light or visible light, irradiation with X-rays or gamma rays or irradiation with high energy particles, such as ions or electrons. Preferably polymerisation is carried out by UV irradiation. As a source for actinic radiation for example a single UV lamp or a set of UV lamps can be used. When using a high lamp power the curing time can be reduced.

Another possible source for actinic radiation is a laser, like for example a UV, IR or visible laser.

Polymerisation is preferably carried out in the presence of an initiator absorbing at the wavelength of the actinic radiation. For this purpose the polymerisable LC material preferably comprises one or more initiators, preferably in a concentration from 0.01 to 10%, very preferably from 0.05 to 5%. For example, when polymerising by means of UV light, a photoinitiator can be used that decomposes under UV irradiation to produce free radicals or ions that start the polymerisation reaction. For polymerising acrylate or methacrylate groups preferably a radical photoinitiator is used. For polymerising vinyl, epoxide or oxetane groups preferably a cationic photoinitiator is used. It is also possible to use a thermal polymerisation initiator that decomposes when heated to produce free radicals or ions that start the polymerisation. Typical radical photoinitiators are for example the commercially available Irgacure® or Darocure® (Ciba AG, Basel, Switzerland). A typical cationic photoinitiator is for example UVI 6974 (Union Carbide).

The polymerisable material may also comprise one or more stabilizers or inhibitors to prevent undesired spontaneous polymerisation, like for example the commercially available Irganox® (Ciba AG, Basel, Switzerland), preferably in a concentration of from 0.005 to 1%, very preferably from 0.01 to 0.1%.

The curing time depends, inter alia, on the reactivity of the polymerisable material, the thickness of the coated layer, the type of polymerisation initiator and the power of the UV lamp. The curing time is preferably ≤5 minutes, very preferably ≤3 minutes, most preferably ≤1 minute. For mass production short curing times of ≤30 seconds are preferred.

Preferably polymerisation is carried out in an inert gas atmosphere like nitrogen or argon.

The polymerisable material may also comprise one or more dyes having an absorption maximum adjusted to the wavelength of the radiation used for polymerisation, in particular UV dyes like e.g. 4,4"-azoxy anisole or Tinuvin® dyes (from Ciba AG, Basel, Switzerland).

In another preferred embodiment the polymerisable material comprises one or more monoreactive polymerisable non-mesogenic compounds, preferably in an amount of 0 to 50%, very preferably 0 to 20%. Typical examples are alkylacrylates or alkylmethacrylates.

In another preferred embodiment the polymerisable material comprises one or more di- or multireactive polymerisable non-mesogenic compounds, preferably in an amount of 0 to 50%, very preferably 0 to 20%, alternatively or in addition to the di- or multireactive polymerisable mesogenic compounds. Typical examples of direactive non-mesogenic compounds are alkyldiacrylates or alkyldimethacrylates with alkyl groups of 1 to 20 C atoms. Typical examples of multireactive non-mesogenic compounds are trimethylpropanetrimethacrylate or pentaerythritoltetraacrylate.

It is also possible to add one or more chain transfer agents to the polymerisable material in order to modify the physical properties of the polymer film. Especially preferred are thiol compounds, for example monofunctional thiols like dodecane thiol or multifunctional thiols like trimethylpropane tri (3-mercaptopropionate). Very preferred are mesogenic or LC thiols as disclosed for example in WO 96/12209, WO 96/25470 or U.S. Pat. No. 6,420,001. By using chain transfer agents the length of the free polymer chains and/or the length of the polymer chains between two crosslinks in the polymer film can be controlled. When the amount of the chain transfer agent is increased, the polymer chain length in the polymer film decreases.

The polymerisable material may also comprise a polymeric binder or one or more monomers capable of forming a polymeric binder, and/or one or more dispersion auxiliaries. Suitable binders and dispersion auxiliaries are disclosed for example in WO 96/02597. Preferably, however, the polymerisable material does not contain a binder or dispersion auxiliary.

The polymerisable material can additionally comprise one or more additives like for example catalysts, sensitizers, stabilizers, inhibitors, chain-transfer agents, co-reacting monomers, surface-active compounds, lubricating agents, wetting agents, dispersing agents, hydrophobing agents, adhesive agents, flow improvers, defoaming agents, deaerators, diluents, reactive diluents, auxiliaries, colourants, dyes, pigments or nanoparticles.

The thickness of a polymer film according to the present invention is preferably from 0.3 to 5 microns, very preferably from 0.5 to 3 microns, most preferably from 0.7 to 1.5 microns. For use as alignment layer, a thin film with a thickness of 0.05 to 1, preferably 0.1 to 0.4 microns is preferred.

The polymer films and materials of the present invention can be used as retardation or compensation film for example in LCDs to improve the contrast and brightness at large viewing angles and reduce the chromaticity. It can be used outside the switchable LC cell of the LCD or between the substrates, usually glass substrates, forming the switchable LC cell and containing the switchable LC medium (incell application).

The polymer film and materials of the present invention can be used in conventional LC displays, for example displays with vertical alignment like the DAP (deformation of aligned phases), ECB (electrically controlled birefringence), CSH (colour super homeotropic), VA (vertically aligned), VAN or VAC (vertically aligned nematic or cholesteric), MVA (multi-domain vertically aligned), PVA (patterned vertically aligned) or PSVA (polymer stabilised vertically aligned) mode; displays with bend or hybrid alignment like the OCB (optically compensated bend cell or optically compensated birefringence), R-OCB (reflective OCB), HAN (hybrid aligned nematic) or pi-cell (π-cell) mode; displays with twisted alignment like the TN (twisted nematic), HTN (highly twisted nematic), STN (super twisted nematic), AMD-TN (active matrix driven TN) mode; displays of the IPS (in plane switching) mode, or displays with switching in an optically isotropic phase.

The layers, films and materials of the present invention can be used for various types of optical films, preferably selected from optically uniaxial films (A-plate, C-plate, negative C-plate, O-plate), twisted optical retarders, like for example twisted quarter wave foils (QWF), achromatic retarders, achromatic QWFs or half wave foils (HWF), and optically biaxial films. The LC phase structure in the layers and materials can be selected from cholesteric, smectic, nematic and blue phases. The alignment of the LC material in the layer can be selected from homeotropic, splayed, tilted, planar and blue-phase alignment. The layers can be uniformly oriented or exhibit a pattern of different orientations.

The films can be used as optical compensator for viewing angle enhancement of LCD's or as a component in a brightness enhancement element, furthermore as an achromatic retarder, for example in reflective or transflective LCD's. Further preferred applications and devices include retarding components in optoelectronic devices requiring similar phase shift at multiple wavelengths, such as combined CD/DVD/HD-DVD/Blu-Ray, including reading, writing re-writing data storage systems achromatic retarders for optical devices such as cameras achromatic retarders for displays including OLED and LCD's.

The following examples are intended to explain the invention without restricting it. The methods, structures and properties described hereinafter can also be applied or transferred to materials that are claimed in this invention but not explicitly described in the foregoing specification or in the examples.

Above and below, unless stated otherwise, all percentages are percent by weight. All temperatures are given in degreees Celsius. "m.p." denotes the melting point, "cl.p." denotes the clearing point, "$T_g$" denotes the glass transition temperature. Furthermore, C=crystalline state, N=nematic phase, S=smectic phase and I=isotropic phase. The data between or behind these symbols represent the transition temperatures. $\Delta n$ denotes the optical anisotropy ($\Delta n = n_e - n_o$, where $n_o$ denotes the refractive index parallel to the longitudinal molecular axes and $n_e$ denotes the refractive index perpendicluar thereto), measured at 550 nm and 20° C. The optical and electrooptical data are measured at 20° C., unless expressly stated otherwise.

Method of measuring the refractive indices of novel single compounds: The refractive indices of a liquid crystal mixture commercially available from Merck KGaA under the product code ZLI4792 are measured using an Abbe refractometer at 20° C. and using a light of wavelength 550 nm.

This mixture is then doped with 10% w/w of the compound under test and the refractive indices are remeasured. Extrapolation to 100% gives the refractive index of the compound under test.

Unless stated otherwise, the percentage of a component of a polymerisable LC material as given above and below are % in weight and refer to the total amount of solids in the polymerisable mixture, i.e. not including solvents.

Example 1

Preparation of a +C-Plate

The following mixture is formulated (in wt. %):

| | |
|---|---|
| Irgacure ® 369 | 1.00 |
| Irgacure ® 1076 | 0.08 |
| DR1a1 | 11.60 |
| MR10a1 | 29.45 |
| MR10a2 | 39.87 |
| 1 | 18.00 |

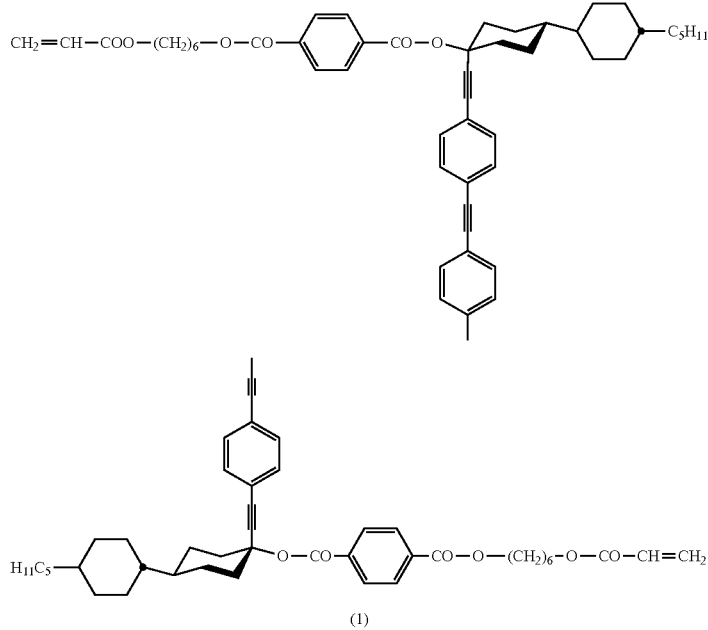

(1)

0.65 g of Toluene/Cyclohexane solution (7:3) are added to 0.25 g of the mixture.

The solution is spin coated at 3000 rpm for 30 s onto an untreated glass slide where it aligns hometropically. The sample is annealed at 65° C. for 60 s, and then UV cured (365 nm filter, 80 mW/cm$^2$) under a nitrogen atmosphere for 60 s at 20° C.

Figure 1B:
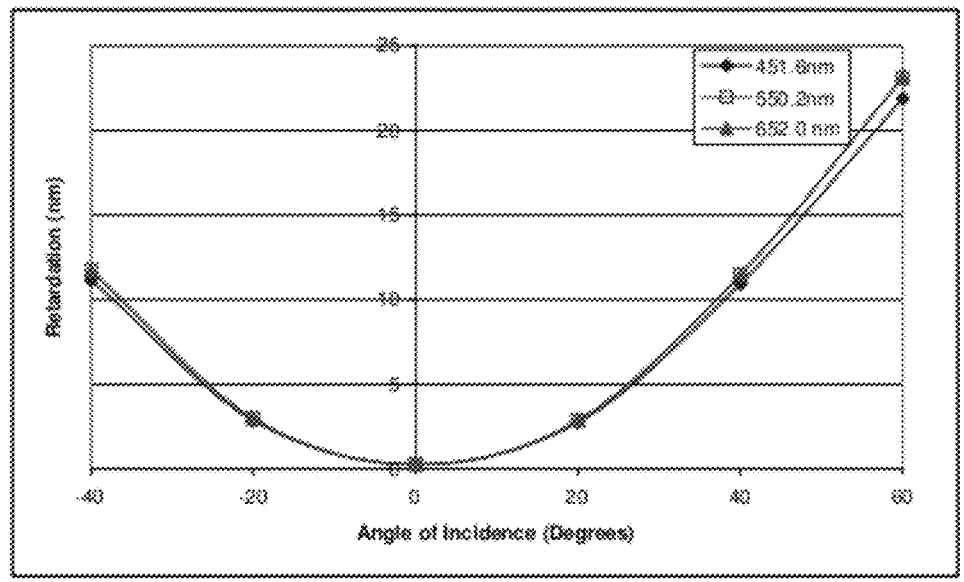
FIG. 1b shows the retardation versus viewing angle at different wavelengths, for a polymer film prepared according to Example 1.

The retardation profile (retardation dispersion and retardation versus viewing angle at different wavelengths) as shown in FIGS. 1a and 1b is measured using an ellipsometer, and the thickness is measured using a surface profiler.

The retardation dispersion values at different angles of incidence are shown in Table 1 below.

TABLE 1

| | Angle (°) | | | | | |
|---|---|---|---|---|---|---|
| | 60 | 40 | 20 | 0 | −20 | −40 |
| R(450)/R(550) | 0.945 | 0.950 | 0.950 | n/a | 0.951 | 0.950 |

The mixture birefringence is 0.062 at 550 nm.

Example 2

Preparation of a +C-Plate

The following mixture is formulated (in wt. %):

| Irgacure ® 369 | 1.00 |
|---|---|
| Irgacure ® 1076 | 0.08 |
| DR1a1 | 11.03 |
| MR10a1 | 27.99 |
| MR10a2 | 37.90 |
| 1 | 22.00 |

0.65 g of Toluene/Cyclohexane solution (7:3) are added to 0.25 g of the mixture.

The solution is spin coated at 3000 rpm for 30 s onto an untreated glass slide where it aligns hometropically. The sample is annealed at 65° C. for 60 s, and then UV cured (365 nm filter, 80 mW/cm$^2$) under a nitrogen atmosphere for 60 s at 20° C.

Figure 2A:
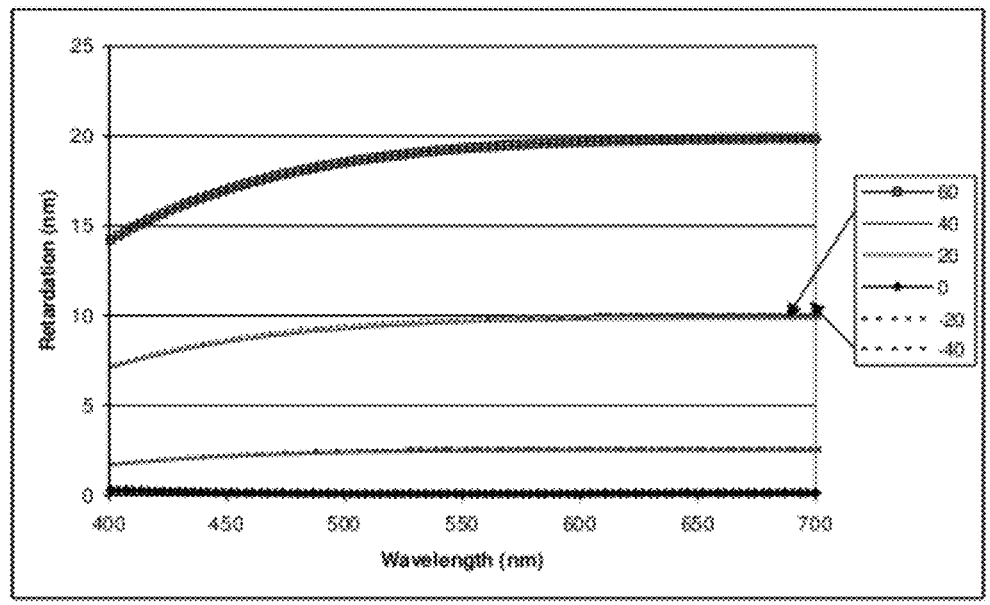
FIG. 2a shows the retardation dispersion.
Figure 2B:
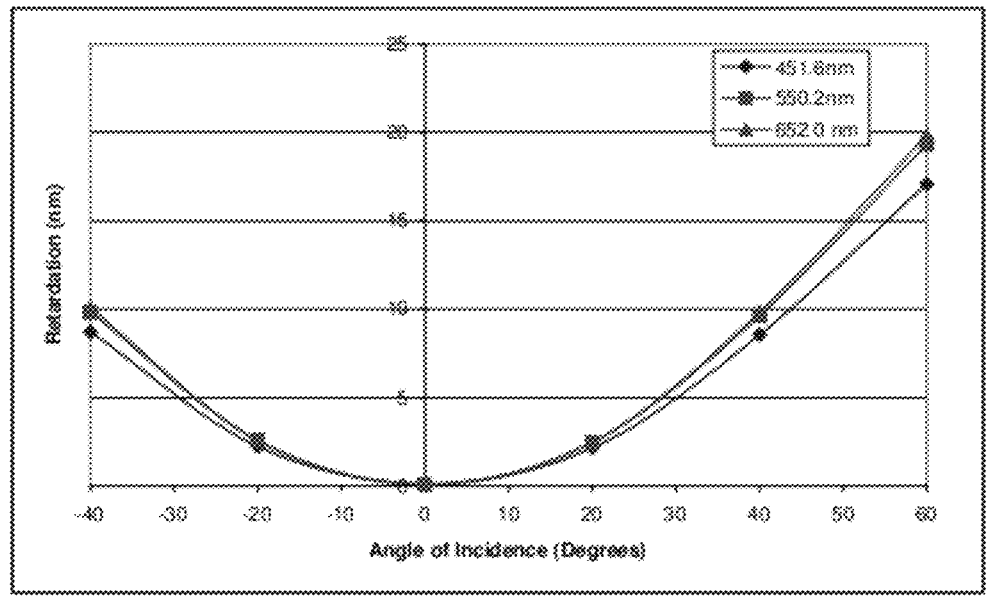
FIG. 2b shows the retardation versus viewing angle at different wavelengths, for a polymer film prepared according to Example 2.

The retardation profile (retardation dispersion and retardation versus viewing angle at different wavelengths) as shown in FIGS. 2a and 2b is measured using an ellipsometer, and the thickness is measured using a surface profiler.

The retardation dispersion values at different angles of incidence are shown in Table 2 below.

TABLE 2

| | Angle (°) | | | | | |
|---|---|---|---|---|---|---|
| | 60 | 40 | 20 | 0 | −20 | −40 |
| R(450)/R(550) | 0.881 | 0.885 | 0.868 | n/a | 0.870 | 0.885 |

The mixture birefringence is 0.054 at 550 nm.

Example 3

Preparation of a +C-Plate

The following mixture is formulated (in wt. %):

| Irgacure ® 369 | 1.00 |
|---|---|
| Irgacure ® 1076 | 0.08 |
| DR1a1 | 10.02 |
| MR10a1 | 25.45 |
| MR10a2 | 34.45 |
| 1 | 29.00 |

0.65 g of Toluene/Cyclohexane solution (7:3) are added to 0.25 g of the mixture.

The solution is spin coated at 3000 rpm for 30 s onto an untreated glass slide where it aligns hometropically. The sample is annealed at 65° C. for 60 s, and then UV cured (365 nm filter, 80 mW/cm$^2$) under a nitrogen atmosphere for 60 s at 20° C.

Figure 3A:
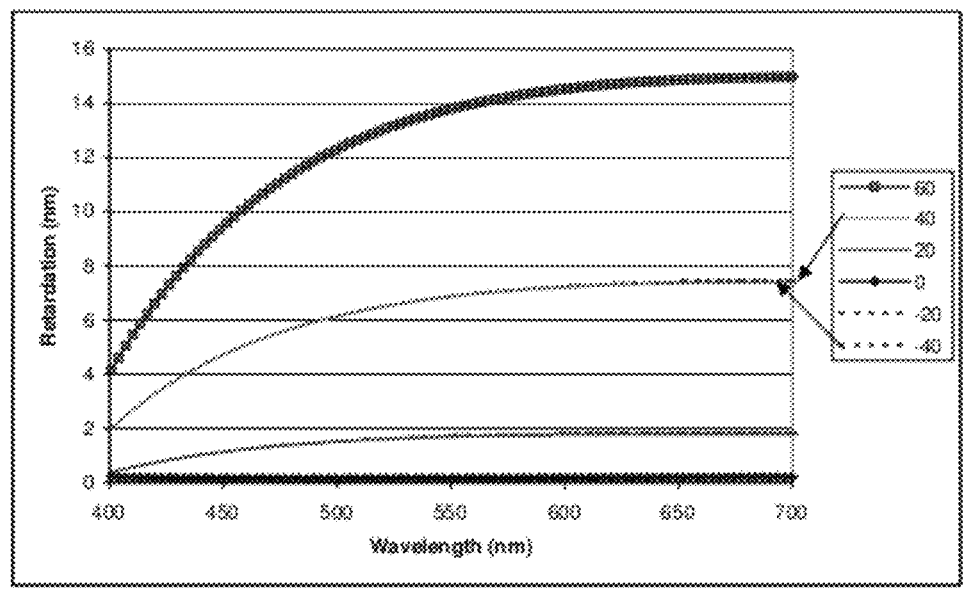
FIG. 3a shows the retardation dispersion.
Figure 3B:
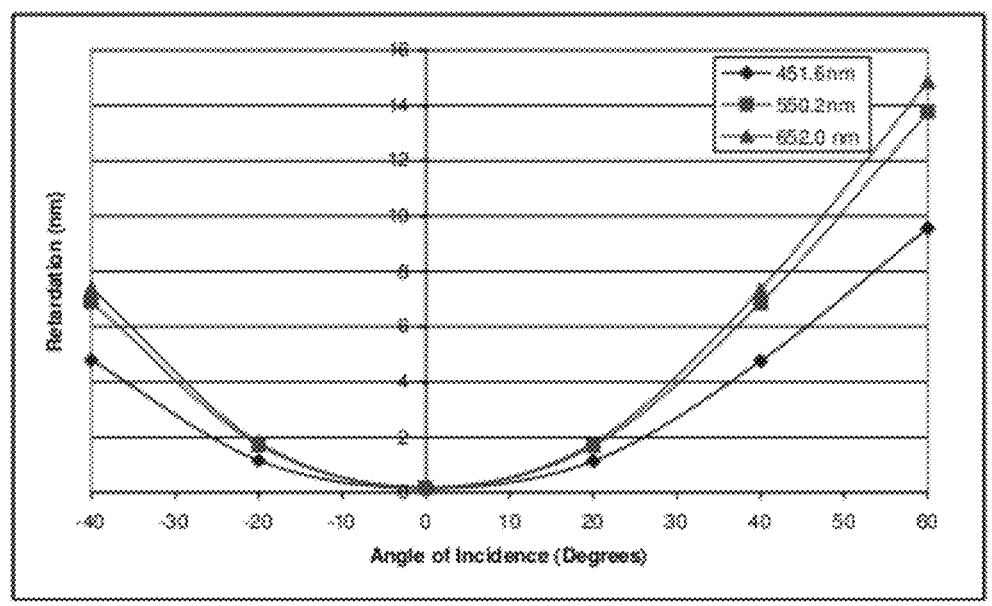
FIG. 3b shows the retardation versus viewing angle at different wavelengths, for a polymer film prepared according to Example 3.

The retardation profile (retardation dispersion and retardation versus viewing angle at different wavelengths) as shown in FIGS. 3a and 3b is measured using an ellipsometer and the thickness is measured using a surface profiler.

The retardation dispersion values at different angles of incidence are shown in Table 3 below.

TABLE 3

| | Angle (°) | | | | | |
|---|---|---|---|---|---|---|
| | 60 | 40 | 20 | 0 | −20 | −40 |
| R(450)/R(550) | 0.685 | 0.686 | 0.668 | n/a | 0.668 | 0.686 |

The mixture birefringence is 0.039 at 550 nm.

Example 4

Preparation of a +A-Plate

The following mixture is formulated (in wt. %):

| FC171 | 1.00 |
|---|---|
| Irgacure ® 369 | 1.00 |
| Irgacure ® 1076 | 0.08 |
| DR1a1 | 20.40 |
| MR7a2 | 17.07 |

| | -continued | |
|---|---|---|
| LC242 | | 28.45 |
| 2 | | 32.00 |

LC242 is a polymerisable chiral material commercially available from BASF AG (Ludwigshafen, Germany).

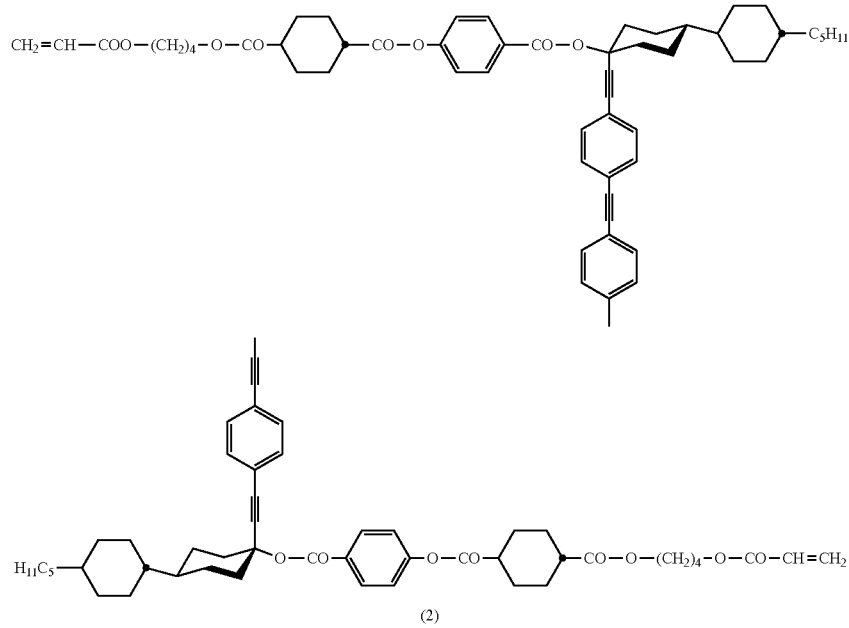

(2)

0.65 g of Toluene/Cyclohexane solution (7:3) are added to 0.25 g of the mixture.

The solution is spin coated at 3000 rpm for 30 s onto a glass slide coated with polyimide where it aligns in planar orientation. The sample is annealed at 65° C. for 60 s, and then UV cured (365 nm filter, 80 mW/cm$^2$) under a nitrogen atmosphere for 60 s at 20° C.

Figure 4A:
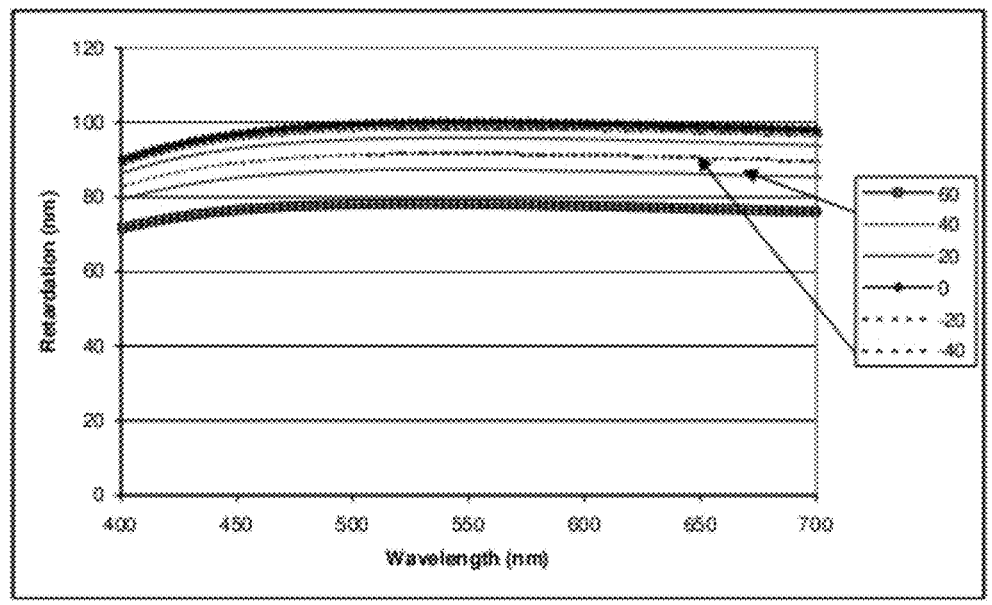
FIG. 4a shows the retardation dispersion.
Figure 4B:
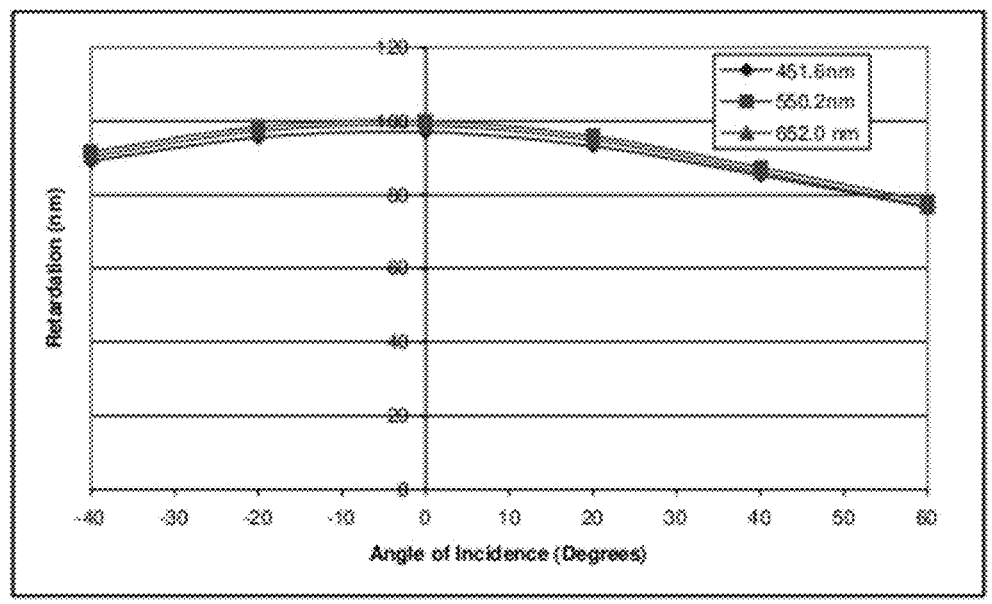
FIG. 4b shows the retardation versus viewing angle at different wavelengths, for a polymer film prepared according to Example 4.

The retardation profile (retardation dispersion and retardation versus viewing angle at different wavelengths) as shown in FIGS. 4a and 4b is measured using an ellipsometer and the thickness is measured using a surface profiler.

The retardation dispersion values at different angles of incidence are shown in Table 4 below.

TABLE 4

| | Angle (°) | | | | | |
|---|---|---|---|---|---|---|
| | 60 | 40 | 20 | 0 | −20 | −40 |
| R(450)/R(550) | 0.979 | 0.974 | 0.970 | 0.969 | 0.969 | 0.972 |

The mixture birefringence is 0.079 at 550 nm.

Example 5

Preparation of an A-Plate

The following mixture is formulated (in wt. %):

| FC171 | 1.00 |
|---|---|
| Irgacure ® 369 | 1.00 |
| Irgacure ® 1076 | 0.08 |
| DR1a1 | 17.92 |

| -continued | |
|---|---|
| MR7a2 | 15.00 |
| LC242 | 25.00 |
| 2 | 40.00 |

0.65 g of Toluene/Cyclohexane solution (7:3) are added to 0.25 g of the mixture.

The solution is spin coated at 3000 rpm for 30 s onto a glass slide coated with polyimide where it aligns in planar orientation. The sample is annealed at 65° C. for 60 s, and then UV cured (365 nm filter, 80 mW/cm$^2$) under a nitrogen atmosphere for 60 s at 20° C.

Figure 5A:
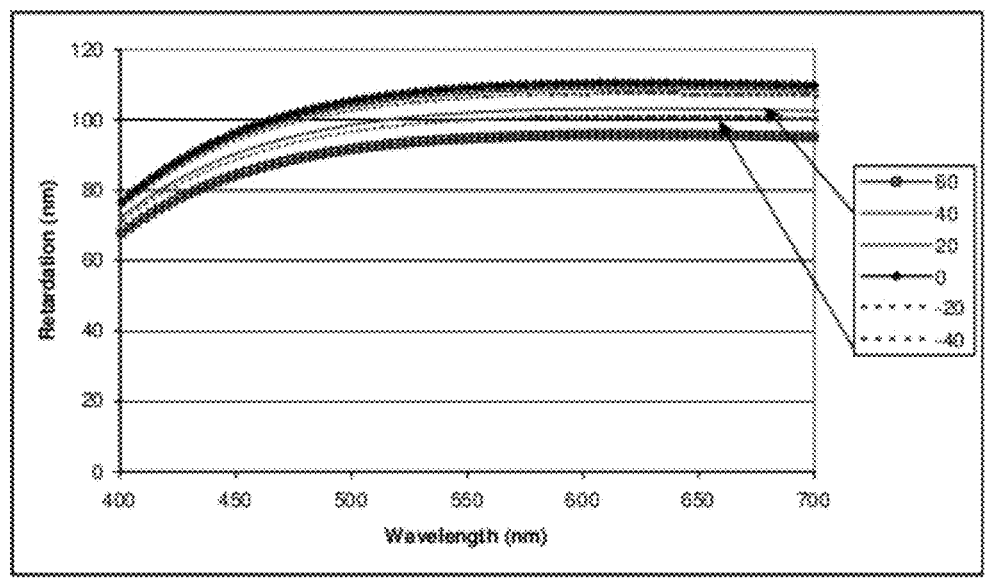
FIG. 5a shows the retardation dispersion.
Figure 5B:
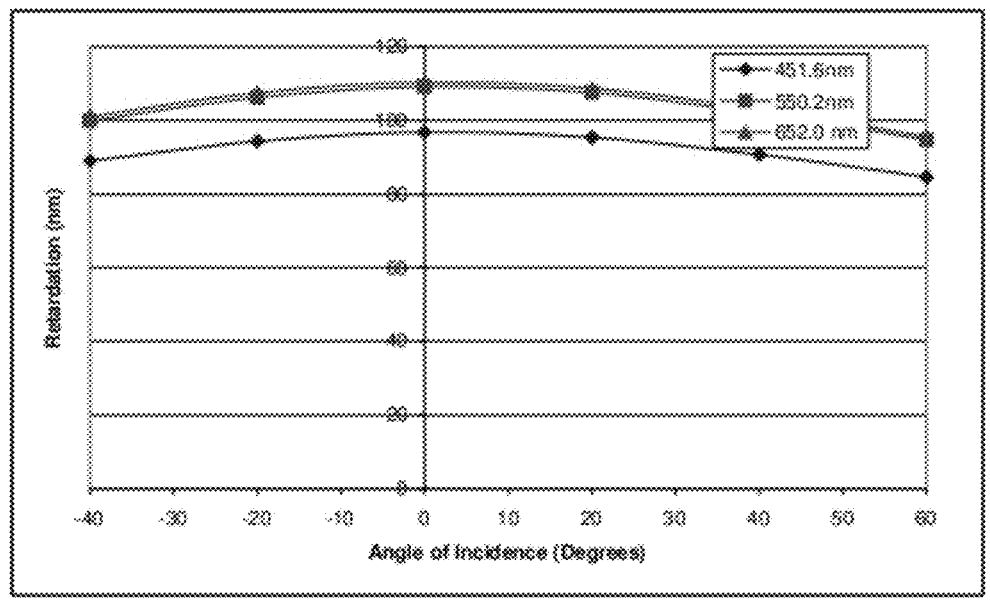
FIG. 5b shows the retardation versus viewing angle at different wavelengths, for a polymer film prepared according to Example 5.

The retardation profile (retardation dispersion and retardation versus viewing angle at different wavelengths) as shown in FIGS. 5a and 5b is measured using an ellipsometer and the thickness is measured using a surface profiler.

The retardation dispersion values at different angles of incidence are shown in Table 5 below.

TABLE 5

| | Angle (°) | | | | | |
|---|---|---|---|---|---|---|
| | 60 | 40 | 20 | 0 | −20 | −40 |
| R(450)/R(550) | 0.896 | 0.889 | 0.884 | 0.883 | 0.885 | 0.890 |

The mixture birefringence is 0.063 at 550 nm.

The invention claimed is:

1. Polymerisable LC material comprising from 1 to 45% of one or more compounds of formula I

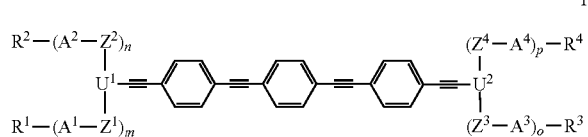

wherein $U^{1,2}$ are independently of each other selected from

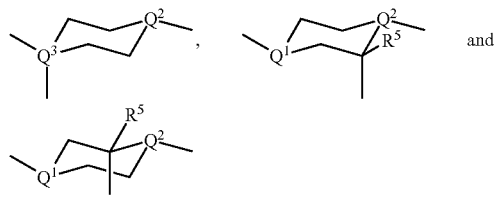

including their mirror images, wherein the rings $U^1$ and $U^2$ are each bonded to the central bitolane group via the axial bond, and one or two non-adjacent $CH_2$ groups in these rings are optionally replaced by O and/or S, and the rings $U^1$ and $U^2$ are optionally substituted by one or more groups L, $Q^{1,2}$ are independently of each other CH or SiH, $Q^3$ is C or Si, $A^{1-4}$ are independently of each other selected from non-aromatic carbocylic or heterocyclic groups and aromatic or heteroaromatic groups, which are optionally substituted by one or more groups $R^5$, and wherein each of $-(A^1-Z^1)_m-U^1-(Z^2-A^2)_n-$ and $-(A^3-Z^3)_o-U^2-(Z^4-A^4)_p-$ does not contain more aromatic groups than non-aromatic groups, $Z^{1-4}$ are independently of each other —O—, —S—, —CO—, —COO—, —OCO—, —O—COO—, —CO—NR$^0$—, —NR$^0$—CO—, —NR$^0$—CO—NR$^0$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_3$—, —(CH$_2$)$_4$—, —CF$_2$CH$_2$—, —CH$_2$CF$_2$—, —CF$_2$CF$_2$—, —CH=CH—, —CY$^1$=CY$^2$—, —CH=N—, —N=CH—, —N=N—, —CH=CR$^0$—, —C≡C—, —CH=CH—COO—, —OCO—CH=CH—, CR$^0$R$^{00}$ or a single bond, $Y^{1,2}$ are independently of each other H, F, Cl, CN or $R^0$, $R^0$ and $R^{00}$ are independently of each other H or alkyl with 1 to 12 C-atoms, m and n are independently of each other 0, 1, 2, 3 or 4, o and p are independently of each other 0, 1, 2, 3 or 4, $R^{1-5}$ are independently of each other identical or different groups selected from H, halogen, —CN, —NC, —NCO, —NCS, —OCN, —SCN, —C(=O)NR$^0$R$^{00}$, —C(=O)X$^0$, —C(=O)R$^0$, —NH$_2$, —NR$^0$R$^{00}$, —SH, —SR$^0$, —SO$_3$H, —SO$_2$R$^0$, —OH, —NO$_2$, —CF$_3$, —SF$_5$, P-Sp-, optionally substituted silyl, or carbyl or hydrocarbyl with 1 to 40 C atoms that is optionally substituted and optionally comprises one or more hetero atoms, or denote P or P-Sp-, or are substituted by P or P-Sp-, wherein the compounds comprise at least one group $R^{1-4}$ that denotes P or P-Sp- or is substituted by P or P-Sp-, P is a polymerisable group, Sp is a spacer group or a single bond, and further comprising from 50% to 99% of polymerisable mesogenic or liquid crystalline compounds different from formula I.

2. Polymerisable LC material according to claim 1, characterized in that $U^1$ and $U^2$ in formula I are selected from

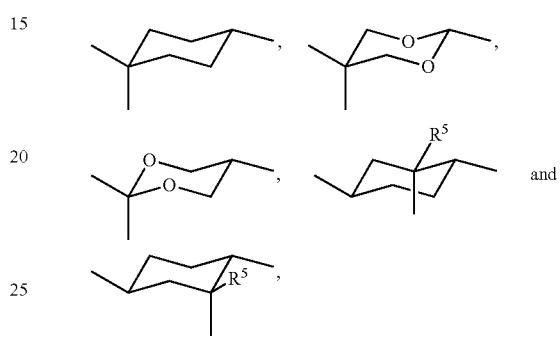

wherein $R^5$ is as defined for the compound of formula I.

3. Polymerisable LC material according to claim 1, characterized in that $A^{1-4}$ in formula I are selected from trans-1,4-cyclohexylene and 1,4-phenylene that is optionally substituted with one or more groups L as defined for the compound of formula I.

4. Polymerisable LC material according to claim 1, characterized in that the mesogenic groups do not comprise more than one unsaturated or aromatic ring.

5. Polymerisable LC material according to claim 1, characterized in that $Z^{1-4}$ in formula I are selected from —O—, —S—, —CO—, —COO—, —OCO—, —O—COO—, —CO—NR$^0$—, —NR$^0$—CO—, —NR$^0$—CO—NR$^0$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_3$—, —(CH$_2$)$_4$—, —CF$_2$CH$_2$—, —CH$_2$CF$_2$—, —CF$_2$CF$_2$—, —CH=CH—, —CY$^1$=CY$^2$—, —CH=N—, —N=CH—, —N=N—, —CH=CR$^0$—, —C≡C—, —CH=CH—COO—, —OCO—CH=CH—, CR$^0$R$^{00}$ or a single bond, wherein $R^0$, $R^{00}$, $Y^1$ and $Y^2$ have the meanings given for the compound of formula I.

6. Polymerisable LC material according to claim 1, characterized in that P in formula I is selected from $CH_2$=CW$^1$—COO—, $CH_2$=CW$^1$—CO—

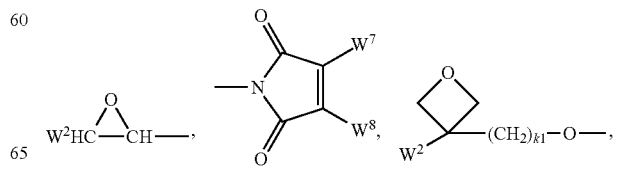

CH$_2$=CW$^2$—(O)$_{k1}$—, CH$_3$—CH=CH—O—, (CH$_2$=CH)$_2$CH—OCO—, (CH$_2$=CH—CH$_2$)$_2$CH—OCO—, (CH$_2$=CH)$_2$CH—O—, (CH$_2$=CH—CH$_2$)$_2$N—, (CH$_2$=CH—CH$_2$)$_2$N—CO—, HO—CW$^2$W$^3$—, HS—CW$^2$W$^3$—, HW$^2$N—, HO—CW$^2$W$^3$—NH—, CH$_2$=CW$^1$—CO—NH—, CH$_2$=CH—(COO)$_{k1}$-Phe-(O)$_{k2}$—, CH$_2$=CH—(CO)$_{k1}$-Phe-(O)$_{k2}$—, Phe-CH=CH—, HOOC—, OCN—, and W$^4$W$^5$W$^6$Si—, with W$^1$ being H, F, Cl, CN, CF$_3$, phenyl or alkyl with 1 to 5 C-atoms, in particular H, Cl or CH$_3$, W$^2$ and W$^3$ being independently of each other H or alkyl with 1 to 5 C-atoms, in particular H, methyl, ethyl or n-propyl, W$^4$, W$^5$ and W$^6$ being independently of each other Cl, oxaalkyl or oxacarbonylalkyl with 1 to 5 C-atoms, W$^7$ and W$^8$ being independently of each other H, Cl or alkyl with 1 to 5 C-atoms, Phe being 1,4-phenylene that is optionally substituted, and k$_1$ and k$_2$ being independently of each other 0 or 1.

7. Polymerisable LC material according to claim 1, characterized in that Sp in formula I is selected of formula Sp'-X', such that P-Sp- is P-Sp'-X'—, wherein Sp' is alkylene with 1 to 20 C atoms, preferably 1 to 12 C-atoms, which is optionally mono- or polysubstituted by F, Cl, Br, I or CN, and wherein one or more non-adjacent CH$_2$ groups are optionally replaced, in each case independently from one another, by —O—, —S—, —NH—, —NR$^0$—, —SiR$^0$R$^{00}$—, —CO—, —COO—, —OCO—, —OCO—O—, —S—CO—, —CO—S—, —NR$^0$—CO—O—, —O—CO—NR$^0$—, —NR$^0$—CO—NR$^0$—, —CH=CH— or —C≡C— in such a manner that O and/or S atoms are not linked directly to one another, X' is —O—, —S—, —CO—, —COO—, —OCO—, —O—COO—, —CO—NR$^0$—, —NR$^0$—CO—, —NR$^0$—CO—NR$^0$—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^0$—, —CY$^1$=CY$^2$—, —C≡C—, —CH=CH—COO—, —OCO—CH=CH— or a single bond, and R$^0$, R$^{00}$, Y$^1$ and Y$^2$ have the meanings given for the compound of formula I.

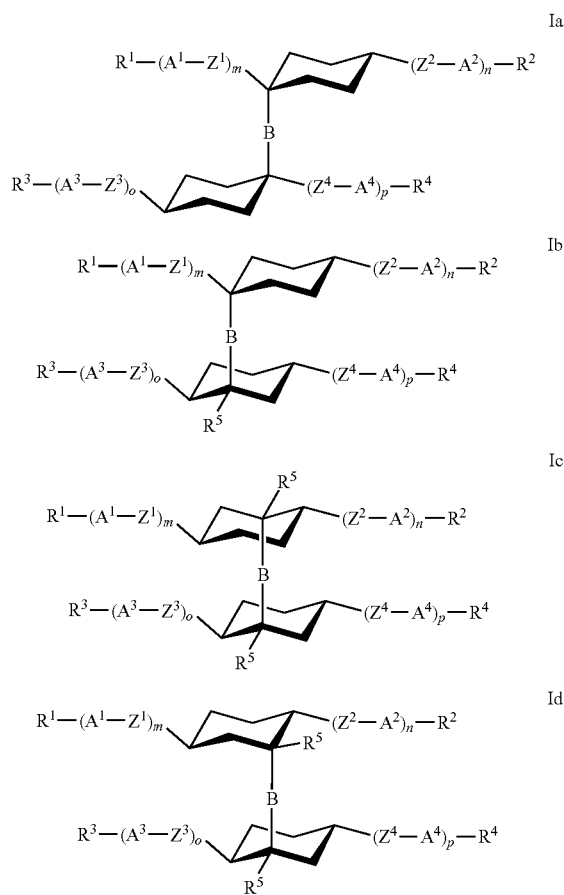

wherein R$^{1-5}$, A$^{1-4}$, Z$^{1-4}$, m, n, o and p have the meanings given for the compound of formula I, and B denotes

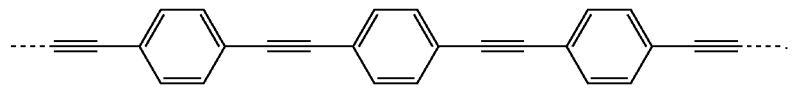

8. Polymerisable LC material according to claim 1, characterized in that the compounds of formula I are selected from the following subformulae

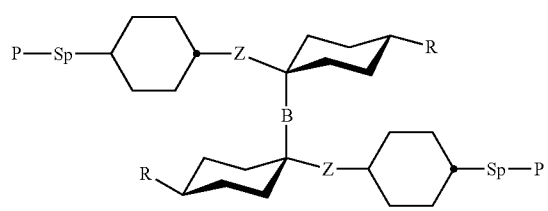

9. Polymerisable LC material according to claim 1, characterized in that the compounds of formula I are selected from the following subformulae

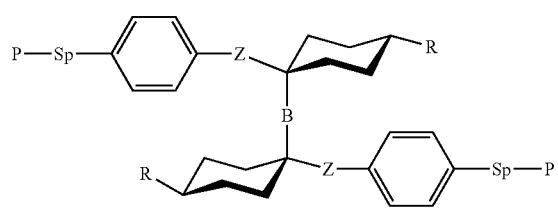

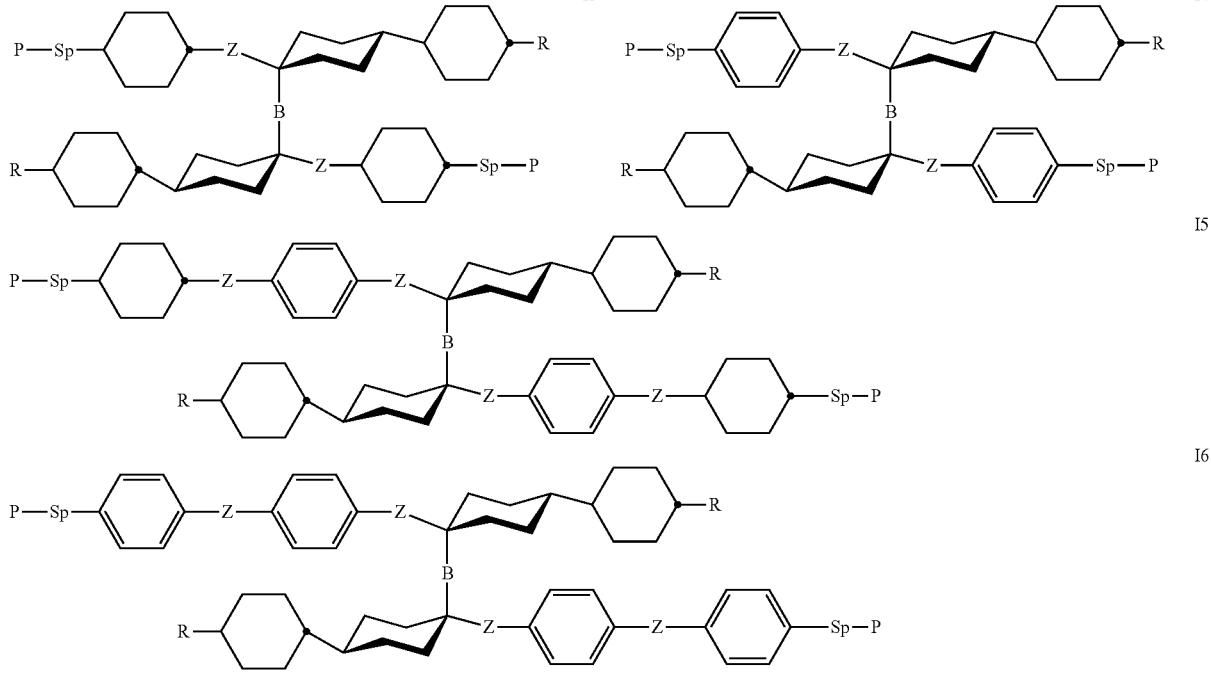

wherein B is

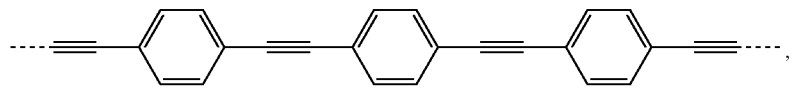

Z has one of the meanings of $Z^1$ given for the compound of formula I, R has one of the meanings of $R^1$ given for the compound of formula I that is different from P-Sp-, P, Sp, L and r are as defined for the compound of formula I, and the benzene rings are optionally substituted by one or more groups L as defined for the compound of formula I.

10. Polymer film being obtained by polymerising a polymerisable LC material according to claim 1.

11. Polymer film according to claim 10, characterized in that it is a +A plate or +C plate.

12. Polymer film according to claim 10, characterized in that it is a +A plate and has a retardation dispersion >0.7 and <0.98 at 0° angle of incidence.

13. Polymer film according to claim 10, characterized in that it is a +C plate and has a retardation dispersion >0.65 and <0.95 at 60° angle of incidence.

14. Polymerisable LC material according to claim 1 or polymer film obtained by polymerising said polymerisable LC material, characterized in that it has a negative retardation dispersion.

15. Polymerisable LC material according to claim 1 or polymer film obtained by polymerising said polymerisable LC material, characterized in that it has a birefringence≥0.05 and <0.15 at 550 nm.

16. Polymerisable LC material according to claim 1, or polymer film obtained by polymerising said polymerisable LC material, characterized in that it has a birefringence≥0.035 and <0.1 at 550 nm.

17. Optical, electronic or electrooptical device, or a component thereof, comprising a polymerisable LC material according claim 1, or a polymer film obtained by polymerising said polymerisable LC material.

18. Component according to claim 17, characterized in that it comprises one or more optically uniaxial films selected from an A-plate, C-plate, negative C-plate or O-plate, a twisted optical retarder, a twisted quarter wave foil (QWF), an optically biaxial film, an achromatic retarder, an achromatic QWF or half wave foil (HWF), a film having a cholesteric, smectic, nematic or blue phase, a film having homeotropic, splayed, tilted, planar or blue-phase alignment, which is uniformly oriented or exhibits a pattern of different orientations.

19. Component according to claim 17, characterized in that it is an optical compensator for viewing angle enhancement, a brightness enhancement element, or an achromatic retarder.

20. Component according to claim 17, characterized in that it is a retarding component in an optoelectronic device requiring similar phase shift at multiple wavelengths, including combined CD/DVD/HD-DVD/Blu-Ray, reading and/or writing and/or re-writing data storage systems, an achromatic retarder for optical devices including cameras, or an achromatic retarder for displays including OLED and LCD's.

21. Device or component according to claim 17, characterized in that is selected from electrooptical displays, LCDs, optical films, polarisers, compensators, beam splitters, reflective films, alignment layers, colour filters, holographic elements, hot stamping foils, coloured images, decorative or security markings, LC pigments, adhesives, non-linear optic (NLO) devices, optical information storage devices, electronic devices, organic semiconductors, organic field effect transistors (OFET), integrated circuits (IC), thin film transistors (TFT), Radio Frequency Identification (RFID) tags, organic light emitting diodes (OLED), organic light emitting transistors (OLET), electroluminescent displays, organic photovoltaic (OPV) devices, organic solar cells (O-SC), organic laser diodes (O-laser), organic integrated circuits (O-IC), lighting devices, sensor devices, electrode materials, photoconductors, photodetectors, electrophotographic recording devices, capacitors, charge injection layers, Schottky diodes, planarising layers, antistatic films, conducting substrates, conducting patterns, photoconductors, electrophotographic applications, electrophotographic recording, organic memory devices, biosensors, biochips, optoelectronic devices requiring similar phase shift at multiple wavelengths, combined CD/DVD/HD-DVD/Blu-Rays, reading, writing re-writing data storage systems, or cameras.

* * * * *